(12) United States Patent
Xu et al.

(10) Patent No.: US 11,899,848 B2
(45) Date of Patent: Feb. 13, 2024

(54) METHOD, MOBILE DEVICE, HEAD-MOUNTED DISPLAY, AND SYSTEM FOR ESTIMATING HAND POSE

(71) Applicant: GUANGDONG OPPO MOBILE TELECOMMUNICATIONS CORP., LTD., Dongguan (CN)

(72) Inventors: Yi Xu, Palo Alto, CA (US); Yang Zhou, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/087,494

(22) Filed: Dec. 22, 2022

(65) Prior Publication Data

US 2023/0127549 A1   Apr. 27, 2023

Related U.S. Application Data

(63) Continuation of application No. PCT/CN2021/101067, filed on Jun. 18, 2021.
(Continued)

(51) Int. Cl.
*G06F 3/01* (2006.01)
*G06V 40/10* (2022.01)
(Continued)

(52) U.S. Cl.
CPC .............. *G06F 3/017* (2013.01); *G06F 3/012* (2013.01); *G06F 3/0338* (2013.01); *G06V 40/11* (2022.01); *G06V 20/20* (2022.01)

(58) Field of Classification Search
CPC ........... G06F 3/017; G06F 1/163; G06F 3/005
See application file for complete search history.

(56) References Cited

U.S. PATENT DOCUMENTS

2016/0342220 A1   11/2016   Kim et al.
2019/0102927 A1*   4/2019   Yokokawa .............. G06F 3/014
(Continued)

FOREIGN PATENT DOCUMENTS

CN     107272892 A    10/2017
WO     2019147421 A1   8/2019

OTHER PUBLICATIONS

International Search Report and Written Opinion dated Sep. 24, 2021 in International Application No. PCT/CN2021/101067.
(Continued)

*Primary Examiner* — Van N Chow
(74) *Attorney, Agent, or Firm* — Sheppard, Mullin, Richter & Hampton LLP

(57) ABSTRACT

A method includes: sensing, by a mobile device when the mobile device is tethered to a head-mounted display (HMD) and when the mobile device is held by a first hand, first data; detecting, by the mobile device, information indicating which hand is used to perform a gesture from the first data; sending, by the mobile device, the information to the HMD; receiving, by the HMD, the information, and not detecting, by the HMD, the information by an image-based detection method; wherein the gesture is performed by a second hand and the information is an updated indication with respect to the gesture considering a hand switch state during a first elapsed duration from a sensing time of the first data to a sensing time of the first image data; and performing, by the HMD, side-adapted hand pose estimation on the first image data using the information.

20 Claims, 12 Drawing Sheets

Related U.S. Application Data

(60) Provisional application No. 63/044,293, filed on Jun. 25, 2020.

(51) Int. Cl.
*G06F 3/0338* (2013.01)
*G06V 20/20* (2022.01)

(56) References Cited

U.S. PATENT DOCUMENTS

2019/0236344 A1* 8/2019 Chen .................. G06F 18/214
2022/0413596 A1* 12/2022 Seger, Jr. ............ G06F 3/011

OTHER PUBLICATIONS

Christian Zimmermann et al, "Learning to Estimate 3D Hand Pose from Single RGB Images", 2017 IEEE International Conference on Computer Vision, 9 pages.
"Detecting Handedness from Device Use", https://stackoverflow.com/questions/27720226/detecting-handedness-from-device-use (2015), 4 pages.
Huy Viet Le et al. "Investigating the feasibility of finger identification on capacitive touchscreens using deep learning", IUI '19: Proceedings of the 24th International Conference on Intelligent User Interfaces, Mar. 17-20, 2019. 13 pages.

* cited by examiner

Sensing, by at least one first inertial sensor of the mobile device when the mobile device is tethered to the HMD and when the mobile device is held by the first hand, the first data which is data reflecting an orientation of the mobile device caused by the first hand holding the mobile device, wherein the data reflecting the orientation of the mobile device is used, when the mobile device is used as a pointing device, to control a pointing direction of a virtual pointer beam — 1302

FIG. 13

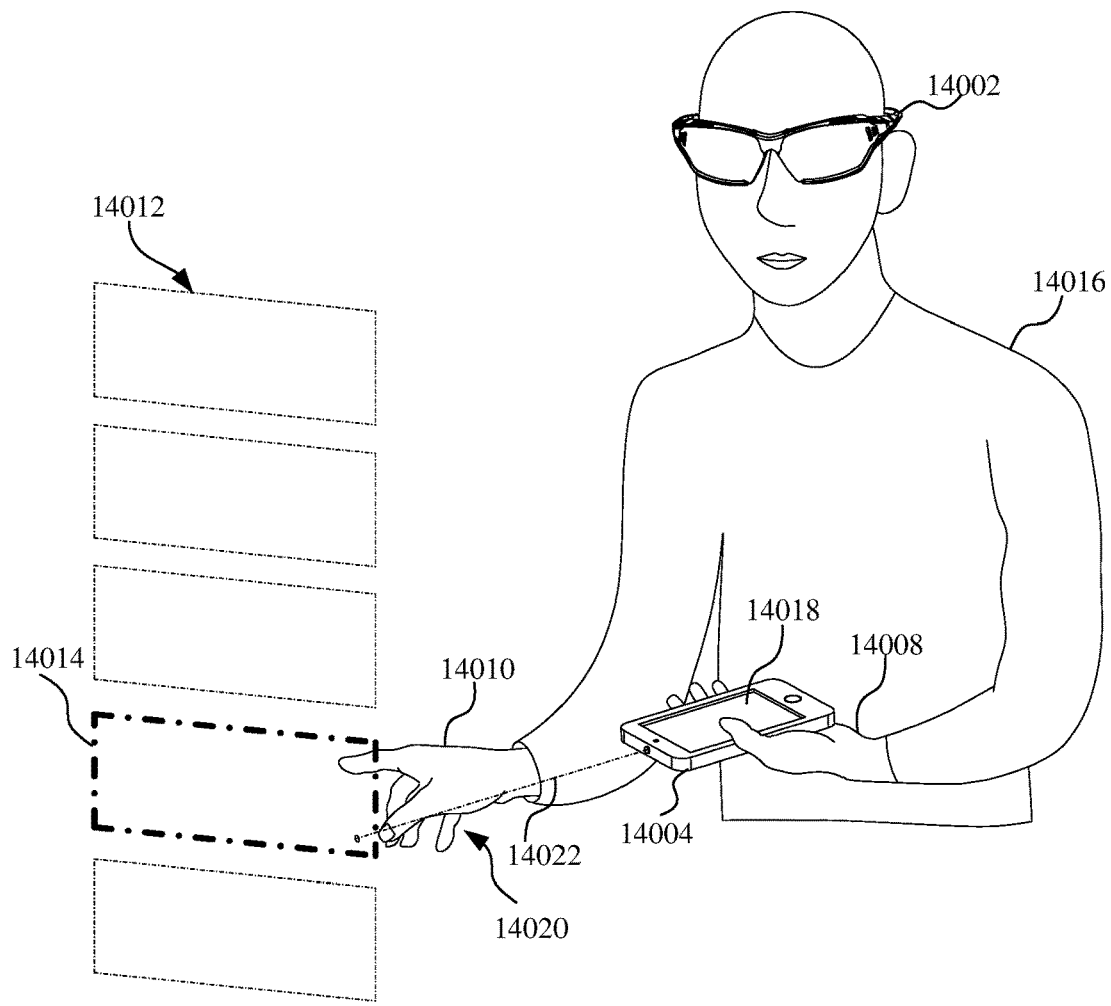

FIG. 14

Sensing, when the mobile device is tethered to the HMD and when the mobile device is held by the first hand, the first data which is third image data sensed by an imaging device of the mobile device, wherein information of a head of a user in the third image data being biased to a side of the third image data is used to detect the information indicating which hand is used to perform the gesture. — 1502

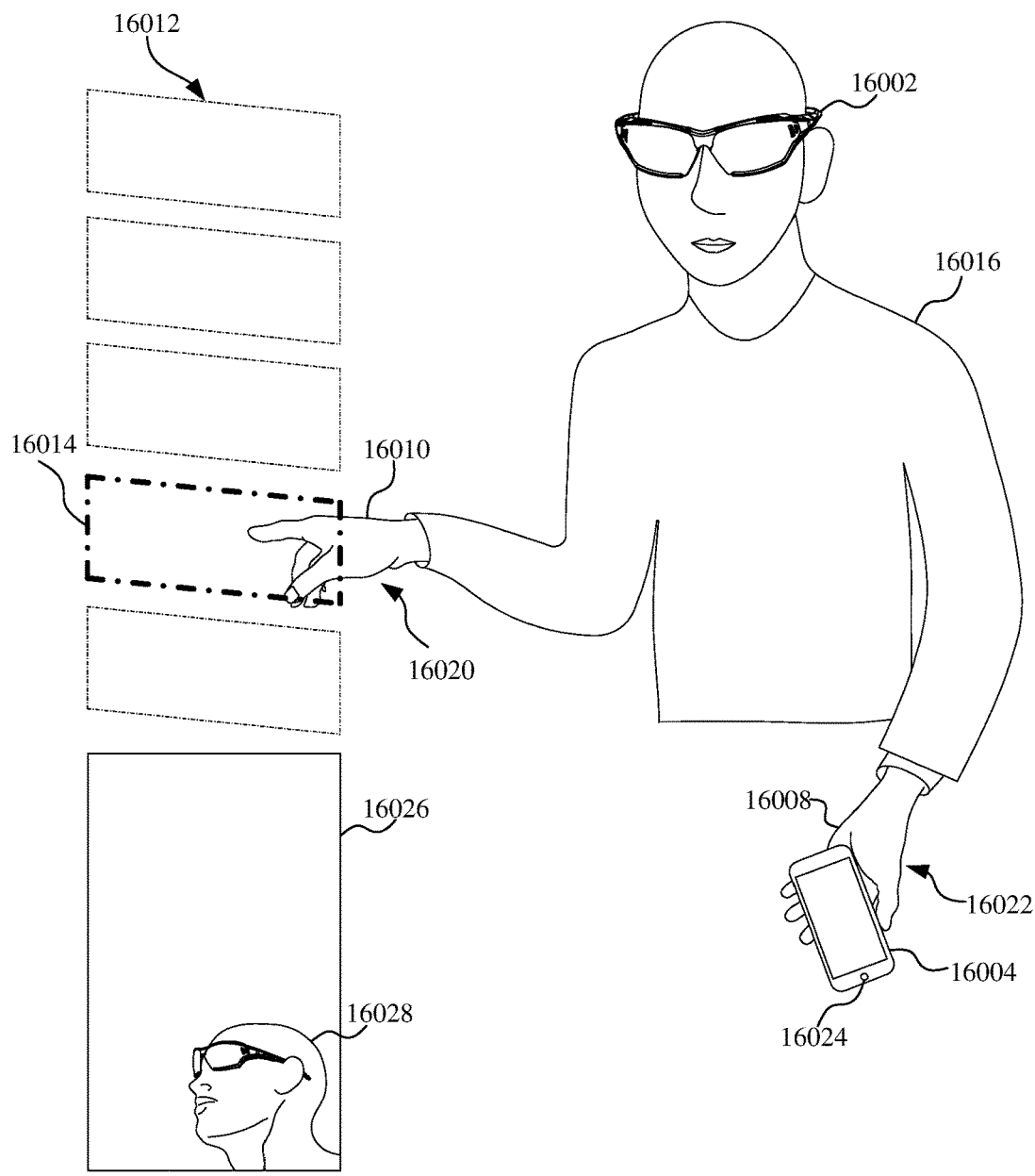

FIG. 16

METHOD, MOBILE DEVICE, HEAD-MOUNTED DISPLAY, AND SYSTEM FOR ESTIMATING HAND POSE

CROSS-REFERENCE TO RELATED APPLICATIONS

This application is a continuation of International Application No. PCT/CN2021/101067 entitled "METHOD, MOBILE DEVICE, HEAD-MOUNTED DISPLAY, AND SYSTEM FOR ESTIMATING HAND POSE" filed on Jun. 18, 2021, which claims priority to U.S. Patent Application No. 63/044,293, entitled "METHOD, MOBILE DEVICE, HEAD-MOUNTED DISPLAY, AND SYSTEM FOR ESTIMATING HAND POSE" filed with USPTO on Jun. 25, 2020, both of which are incorporated herein by reference in their entireties.

FIELD

The present disclosure relates to the field of estimating a hand pose by a head-mounted display.

BACKGROUND

A gesture can be used for user interaction with virtual reality (VR), augmented reality (AR), mixed reality (MR), or extended reality (XR) environment presented in a head-mounted display (HMD). The gesture can be estimated by performing hand pose estimation on image data of the gesture. Performing the hand pose estimation on the image data is a task of finding a set of joints (e.g., 2D or 3D key point locations) of a hand that is used to perform the gesture from the image data. For the hand pose estimation that uses side-adapted hand pose estimation, information of which of two hands (i.e., a left hand and a right hand) is used to perform the gesture is needed. For one type of the side-adapted hand pose estimation, the information of which of the two hands is used to perform the gesture is needed for determining whether to use right-hand pose estimation or left-hand pose estimation to perform side-dependent hand pose estimation on the image data which is side-dependent. For another type of the side-adapted hand pose estimation, the information of which of the two hands is used to perform the gesture is needed for determining whether to flip the image data to perform side-dependent hand pose estimation on side-agnostic image data.

One method for obtaining the information of which of the two hands is used to perform the gesture is to ask a user to explicitly specify handedness (i.e., a dominant hand) of the user and the handedness is always used as information of which of the two hands is used to perform every gesture. However, this method is not practical for all situations. For example, for some of the situations, the user may use his/her right hand to perform a gesture and then the user may switch to use his/her left hand to perform another gesture. Another method for obtaining the information of which of the two hands is used to perform the gesture is to detect the information from the image data by an imaging-based detection method. Advantageously, for this method, the information of which of the two hands is used to perform the gesture is updated with respect to the gesture.

SUMMARY

For existing hand pose estimation that uses an imaging-based detection method to detect information of which hand is used to perform a gesture from image data of the gesture, overall speed of the hand pose estimation is slowed down because the step of detecting the information of which hand is used to perform the gesture is at least one of a slower step or a sequential processing step. When a head-mounted display (HMD) is tethered to a mobile device, and the mobile device is additionally used as an input device for user interaction with virtual reality (VR), augmented reality (AR), mixed reality (MR), or extended reality (XR) environment presented in the HMD, using the existing hand pose estimation that uses the imaging-based detection method fails to recognize that as proposed by the present disclosure, using the mobile device instead to detect information indicating which hand is used to perform the gesture enhances speed of the existing hand pose estimation.

In accordance with a first aspect of the present disclosure, a method performed by a mobile device, includes: sensing, by a sensing device of the mobile device when the mobile device is tethered to an HMD and when the mobile device is held by a first hand, first data; detecting, by at least one processor of the mobile device, information indicating which hand is used to perform a gesture to be estimated from first image data by at least one self-owned or agent processor of the HMD, wherein the information indicating which hand is used to perform the gesture is not detected, by the HMD, from the first image data by an imaging-based detection method and is detected from the first data; sending, by the at least one processor of the mobile device, the information indicating which hand is used to perform the gesture to the at least one self-owned or agent processor of the HMD so that, performing timing of the sending step being such that the at least one self-owned or agent processor of an HMD performs side-adapted hand pose estimation on the first image data using the information indicating which hand is used to perform the gesture; wherein the gesture is performed by a second hand and the information indicating which hand is used to perform the gesture is an updated indication with respect to the gesture considering a hand switch state during a first elapsed duration from a sensing time of the first data to a sensing time of the first image data.

In accordance with a second aspect of the present disclosure, a method performed by an HMD includes: receiving, by at least one self-owned or agent processor of the HMD, information indicating which hand is used to perform a gesture to be estimated from first image data, and not detecting, by the at least one self-owned or agent processor of the HMD, the information indicating which hand is used to perform the gesture by an image-based detection method; wherein the information indicating which hand is used to perform the gesture is detected by a mobile device from first data sensed by a sensing device of the mobile device when the HMD is tethered to the mobile device and when the mobile device is held by a first hand; and wherein the gesture is performed by a second hand and the information indicating which hand is used to perform the gesture is an updated indication with respect to the gesture considering a hand switch state during a first elapsed duration from a sensing time of the first data to a sensing time of the first image data; and performing, by the at least one self-owned or agent processor of the HMD, side-adapted hand pose estimation on the first image data using the information indicating which hand is used to perform the gesture.

In accordance with a third aspect of the present disclosure, a method performed by a mobile device and an HMD, includes: sensing, by a sensing device of the mobile device when the mobile device is tethered to the HMD and when the mobile device is held by a first hand, first data; detecting, by at least one processor of the mobile device, information indicating which hand is used to perform a gesture to be estimated from first image data by at least one self-owned or agent processor of the HMD, wherein the information indicating which hand is used to perform the gesture is detected from the first data; sending, by the at least one processor of the mobile device, the information indicating which hand is used to perform the gesture to the at least one self-owned or agent processor of the HMD; receiving, by the at least one self-owned or agent processor of the HMD, information indicating which hand is used to perform the gesture, and not detecting, by the at least one self-owned or agent processor of the HMD, the information indicating which hand is used to perform the gesture by an image-based detection method; wherein the gesture is performed by a second hand and the information indicating which hand is used to perform the gesture is an updated indication with respect to the gesture considering a hand switch state during a first elapsed duration from a sensing time of the first data to a sensing time of the first image data; and performing, by the at least one self-owned or agent processor of the HMD, side-adapted hand pose estimation on the first image data using the information indicating which hand is used to perform the gesture.

In accordance with a fourth aspect of the present disclosure, a mobile device, includes: a sensing device configured to perform a step of sensing, when the mobile device is tethered to a head mounted display (HMD) and when the mobile device is held by a first hand, first data; a memory; and at least one processor coupled to the memory and configured to perform steps including: detecting information indicating which hand is used to perform a gesture to be estimated from first image data by at least one self-owned or agent processor of the HMD, wherein the information indicating which hand is used to perform the gesture is not detected, by the HMD, from the first image data by an imaging-based detection method and is detected from the first data; sending the information indicating which hand is used to perform the gesture to the at least one self-owned or agent processor of the HMD so that, performing timing of the sending step being such that the at least one self-owned or agent processor of an HMD performs side-adapted hand pose estimation on the first image data using the information indicating which hand is used to perform the gesture; wherein the gesture is performed by a second hand and the information indicating which hand is used to perform the gesture is an updated indication with respect to the gesture considering a hand switch state during a first elapsed duration from a sensing time of the first data to a sensing time of the first image data.

In accordance with a fifth aspect of the present disclosure, an HMD, includes: a memory; and at least one self-owned processor coupled to the memory and configured to perform steps including: receiving information indicating which hand is used to perform a gesture to be estimated from first image data, and not detecting the information indicating which hand is used to perform the gesture by an image-based detection method; wherein the information indicating which hand is used to perform the gesture is detected by a mobile device from first data sensed by a sensing device of the mobile device when the HMD is tethered to the mobile device and when the mobile device is held by a first hand; and wherein the gesture is performed by a second hand and the information indicating which hand is used to perform the gesture is an updated indication with respect to the gesture considering a hand switch state during a first elapsed duration from a sensing time of the first data to a sensing time of the first image data; and performing side-adapted hand pose estimation on the first image data using the information indicating which hand is used to perform the gesture.

In accordance with a sixth aspect of the present disclosure, a system, includes: a mobile device, including: a sensing device configured to perform a step of sensing when the mobile device is tethered to an HMD and when the mobile device is held by a first hand, first data; a first memory; and at least one processor coupled to the first memory and configured to perform steps including: detecting information indicating which hand is used to perform a gesture to be estimated from first image data by at least one self-owned or agent processor of the HMD, wherein the information indicating which hand is used to perform the gesture is detected from the first data; sending, by the at least one processor of the mobile device, the information indicating which hand is used to perform the gesture to the at least one self-owned or agent processor of the HMD; the HMD, including: a second memory; and at least one self-owned or agent processor coupled to the second memory and configured to perform steps including: receiving information indicating which hand is used to perform the gesture, and not detecting the information indicating which hand is used to perform the gesture by an image-based detection method; wherein the gesture is performed by a second hand and the information indicating which hand is used to perform the gesture is an updated indication with respect to the gesture considering a hand switch state during a first elapsed duration from a sensing time of the first data to a sensing time of the first image data; and wherein the steps performed by the at least one self-owned or agent processor of HMD further includes: performing side-adapted hand pose estimation on the first image data using the information indicating which hand is used to perform the gesture.

BRIEF DESCRIPTION OF THE DRAWINGS

In order to more clearly illustrate the embodiments of the present disclosure or related art, the following figures to be described in the embodiments are briefly introduced. It is obvious that the drawings are merely some embodiments of the present disclosure, and a person having ordinary skill in this field can obtain other figures according to these figures without making creative efforts.

FIGS. 7 and 8 include flowcharts of steps that cooperatively achieve the information indicating which hand is used to perform the gesture is the updated indication with respect to the gesture considering no occurrences of hand switch is possible during the first elapsed duration when the first elapsed duration is shorter than the longest duration impossible for hand switch and when the first elapsed duration is equal to the longest duration impossible for hand switch, and every detected second occurrence of hand switch during the first elapsed duration when the first elapsed duration is longer than the longest duration impossible for hand switch in accordance with some embodiments of the present disclosure.

FIG. 13 is a flowchart of a step related to using data reflecting an orientation of the mobile device for detecting the information indicating which hand is used to perform the gesture in accordance with some embodiments of the present disclosure.

FIG. 14 depicts an illustrative example for some embodiments in which a feature of the data reflecting the orientation of the mobile device is used.

FIG. 15 is a flowchart of a step related to using image data sensed by an imaging device of the mobile device for detecting the information indicating which hand is used to perform the gesture in accordance with some embodiments of the present disclosure.

FIG. 16 depicts an illustrative example for some embodiments in which a feature of the image data sensed by the imaging device of the mobile device is used.

DETAILED DESCRIPTION

As used here, when at least one operation is referred to as being performed "using", "from", "on", or "on the basis of" at least one object, the at least one operation is performed "directly using", "directly from", "directly on", or "directly on the basis of" the least one object, or at least one intervening operation can be present. In contrast, when the at least one operation is referred to as being performed "directly using", "directly from", "directly on", or "directly on the basis of" the least one object, no intervening operation present.

As used here, when at least one operation is referred to as being "in response to" at least another operation, the at least one operation is performed "directly in response to" the at least another operation, or at least one intervening operation can be present. In contrast, when the at least one operation is referred to as being performed "directly in response to" the at least another operation.

Figure 1:
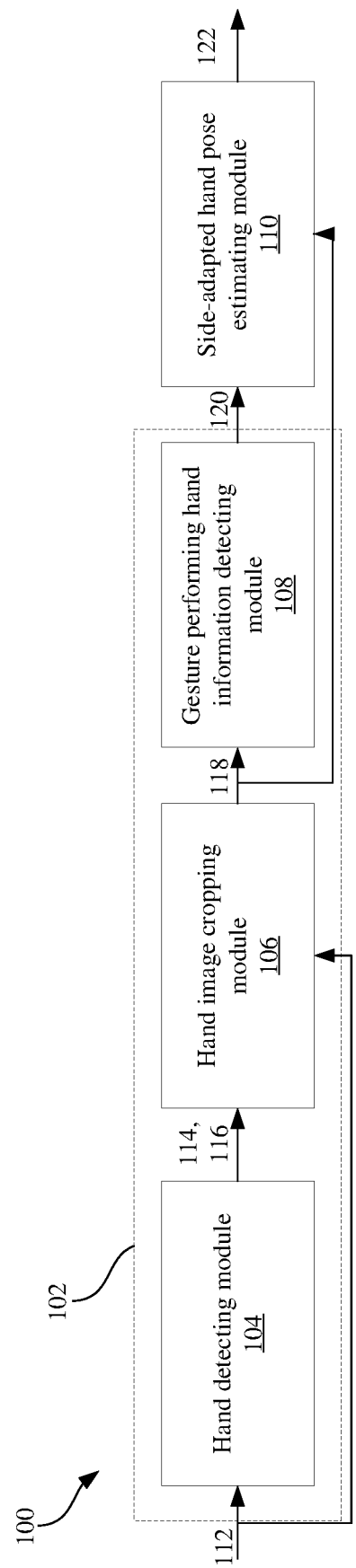
FIG. 1 is a block diagram illustrating existing hand pose estimation that uses an imaging-based detection method to detect information of which hand is used to perform a gesture from image data of the gesture.

Referring to FIG. 1, FIG. 1 is a block diagram illustrating existing hand pose estimation that uses an imaging-based detection method to detect information of which hand is used to perform a gesture from image data of the gesture. An example of the existing hand pose estimation 100 can be found in "Learning to Estimate 3D Hand Pose from Single RGB Images", C. Zimmermann and T. Brox, ICCV 2017. The existing hand pose estimation 100 receives the image data 112 of the gesture and is configured to find a set of joints of a hand 122 that is used to perform the gesture from the image data. The existing hand pose estimation 100 includes an object detection network 102 and a side-adapted hand pose estimating module 110. The object detection network 102 includes a hand detecting module 104, a hand image cropping module 106, and a gesture performing hand information detecting module 108. The object detection network 102 receives the image data 112 and is configured to detect the information of which hand is used to perform the gesture from the image data 112. In this way, the gesture performing hand information detecting module 108 is implemented by a deep learning model of object detection (i.e., the imaging-based detection method). More specifically, the object detection network 102 is firstly trained offline, then used for online inference. The hand detection module 104 receives the image data 112 and is configured to, during online inference, output a hand presence probability 114 (ranging from 0 to 1) and a hand location 116 (e.g., a bounding box surrounding the hand in the image data 112). The hand presence probability 114 determines whether the existing hand pose estimation 100 will execute a subsequent part of the existing hand pose estimation 100. For example, if the hand presence probability 114 is below a certain threshold (e.g., 0.5), the subsequent part of the existing hand pose estimation 100 will not be executed. If the hand presence probability 114 is above the certain threshold, the hand image cropping module 106 receives the image data 112 and the hand location 116 and is configured to crop the image data 112 using the hand location 116 to generate a cropped image data 118. Thus, a subsequent part of the existing hand pose estimation 100 focuses only on the hand. This results in better hand pose estimation accuracy because a fewer number of background pixels are processed. The gesture performing hand information detecting module 108 receives the cropped image data 118 and is configured to determine information of which hand is used to perform the gesture 120 (i.e., a probability of whether the hand is a left hand or a right hand ranging from 0 to 1) using the cropped image data 118. For one type of the side-adapted hand pose estimating module 110, the information of which hand is used to perform the gesture 120 is used to determine whether to use right-hand pose estimation or left-hand pose estimation to perform side-dependent hand pose estimation on the cropped image data 118 which is side-dependent. For another type of the side-adapted hand pose estimating module 110, the information of which hand is used to perform the gesture 120 is used to determine whether to flip the cropped image data 118 along the y-axis to perform side-dependent hand pose estimation on side-agnostic cropped image data. The side-adapted hand pose estimating module 110 outputs the set of joints of the hand 122 that is used to perform the gesture.

For the existing hand pose estimation 100 that uses the imaging-based detection method to detect the information of which hand is used to perform the gesture from image data of the gesture, overall speed of the hand pose estimation method is slowed down because the step of detecting the information of which hand is used to perform the gesture performed by the gesture performing hand information detecting module 108 is at least one of a sequential processing step or a slower step. When a head-mounted display (HMD) is tethered to a mobile device, and the mobile device is additionally used as an input device for user interaction with virtual reality (VR), augmented reality (AR), mixed reality (MR), or extended reality (XR) environment presented in the HMD, using the existing hand pose estimation 100 fails to recognize that as proposed by the present disclosure, using the mobile device instead to detect information indicating which hand is used to perform the gesture enhances speed of the existing hand pose estimation 100.

In accordance with a first embodiment of the present disclosure, the mobile device can be used to detect information of which hand holds the mobile device from data sensed by the mobile device. Because the data sensed by the mobile device is separated from the image data of the gesture, in order for the information of which hand holds the mobile device to provide an indication of which hand is used to perform the gesture which is updated with respect to the gesture, a hand switch state during an elapsed duration from a sensing time of the data sensed by the mobile device to a sensing time of the image data of the gesture need to be impossible for hand switch or possible for hand switch and every occurrence of hand switch during the elapsed duration is detected. In this way, the information of which hand is used to perform the gesture can be deduced from the information of which hand holds the mobile device because the hand performing the gesture has to be opposite to the hand holding the mobile device when the hand switch is impossible and has to be opposite to the last hand holding the mobile device deduced from the information of which hand holds the mobile device and the number of occurrence(s) of hand switch when the hand switch is possible and every occurrence of hand switch during the elapsed duration is detected. The deficiency that the step of detecting the information of which hand is used to perform the gesture is a sequential processing step for the existing hand pose estimation 100 can be improved by parallelly processing HMD-performed part of hand pose estimation and mobile-device performed part of the hand pose estimation. In addition, the deficiency that the step of detecting the information of which hand is used to perform the gesture is a slower step for the existing hand pose estimation 100 can be improved by using a type of the data sensed by the mobile device that results in faster detection of the information of which hand holds the mobile device compared with the imaging-based detection method. Any solution for improving this deficiency can be used in conjunction with sequentially processing the step of detecting the information of which hand is used to perform the gesture in the hand pose estimation or parallelly processing the HMD-performed part of the hand pose estimation and the mobile-device performed part of the hand pose estimation.

Figure 2:
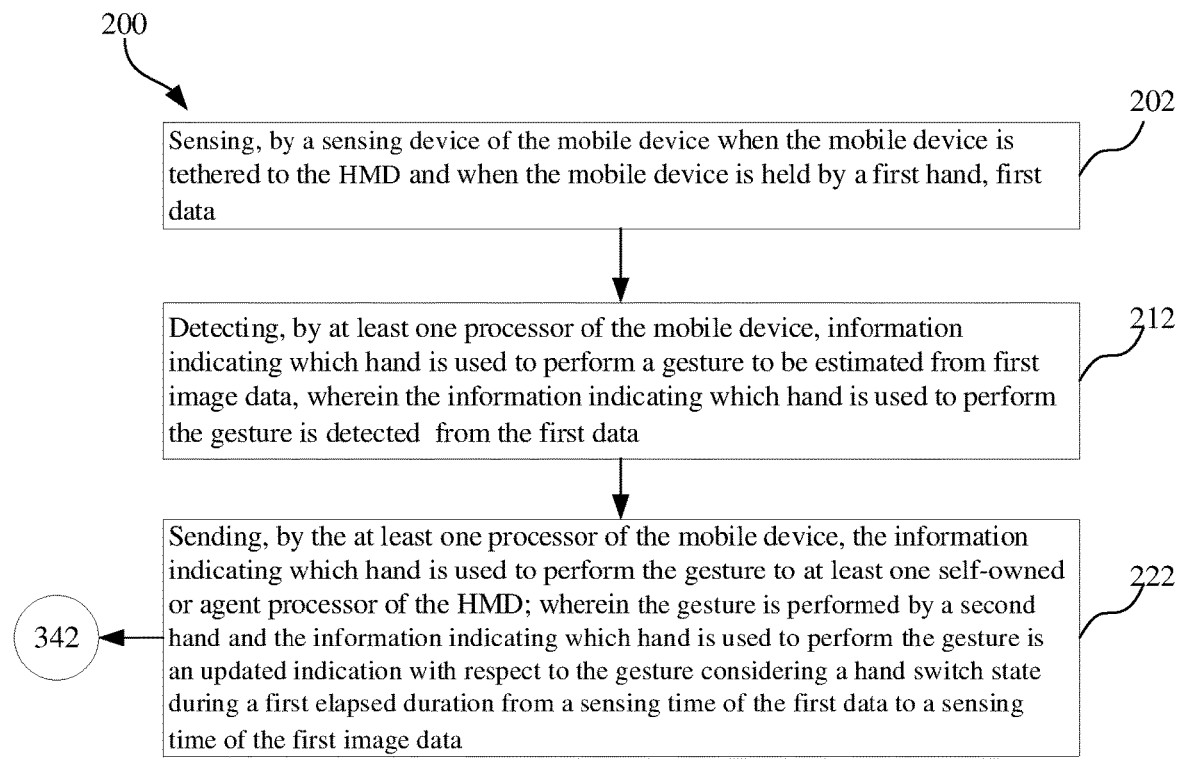
FIG. 2 is a flowchart of a method performed by a mobile device for estimating a gesture in accordance with some embodiments of the present disclosure.
Figure 3:
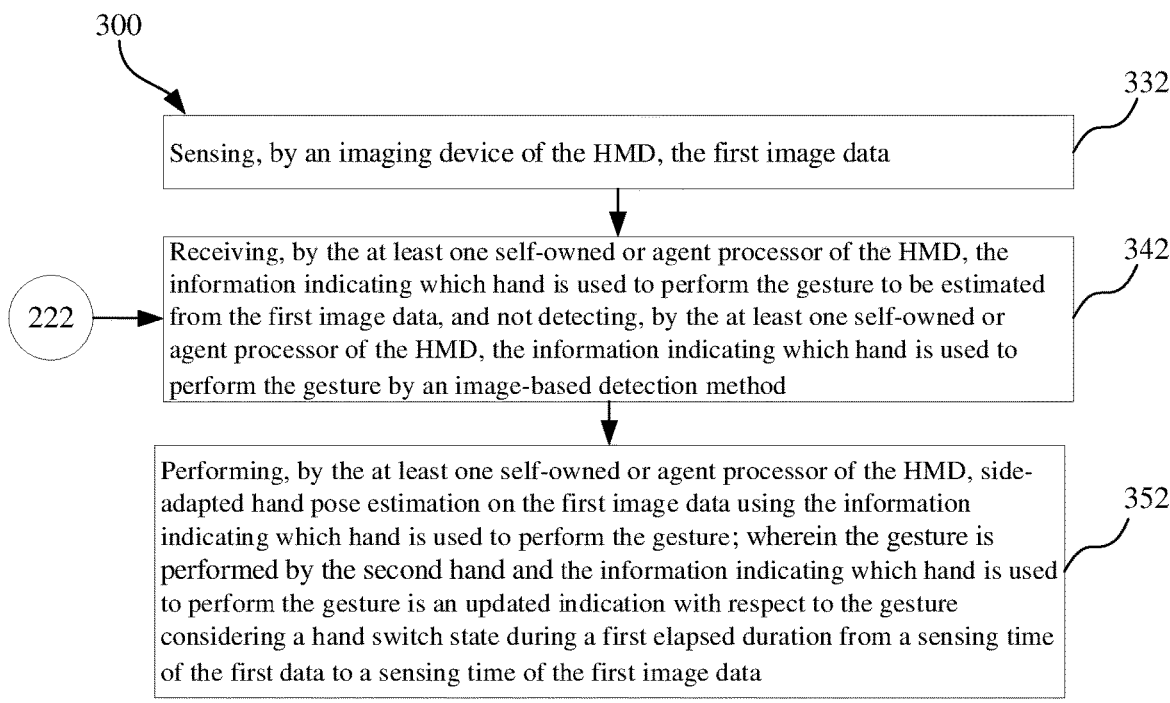
FIG. 3 is a flowchart of a method performed by a head mounted display (HMD) for estimating the gesture in accordance with some embodiments of the present disclosure.

Referring to both FIGS. 2 and 3, FIG. 2 is a flowchart of a method 200 performed by the mobile device 1904 for estimating a gesture, and FIG. 3 is a flowchart of a method 300 performed by the HMD 1902 for estimating the gesture in accordance with a first embodiment of the present disclosure.

In accordance with the first embodiment of the present disclosure, the method 200 performed by the mobile device 1904 includes the following steps.

In a step 202, first data is sensed by a sensing device of the mobile device 1904 when the mobile device 1904 is tethered to the HMD 1902 and when the mobile device 1904 is held by a first hand. In an embodiment of the sensing device to be described with reference to FIGS. 9 to 12, the sensing device is a touchscreen 1918. In another embodiment of the sensing device to be described with reference to FIGS. 13 and 14, the sensing device is at least one first inertial sensor 1920. In still another embodiment of the sensing device to be described with reference to FIGS. 15 and 16, the sensing device is an imaging device 1922.

In a step 212, information indicating which hand is used to perform a gesture to be estimated from first image data is detected by at least one processor 1926 of the mobile device 1904. The information indicating which hand is used to perform the gesture is detected from the first data.

In a step 222, the information indicating which hand is used to perform the gesture is sent by the at least one processor 1926 of the mobile device 1904 to at least one self-owned or agent processor 1912 or 1926 of the HMD 1902.

The gesture is performed by a second hand and the information indicating which hand is used to perform the gesture is an updated indication with respect to the gesture considering a hand switch state during a first elapsed duration from a sensing time of the first data to a sensing time of the first image data.

In accordance with the first embodiment of the present disclosure, the method 300 performed by the HMD 1902 includes the following steps.

In a step 332, the first image data is sensed by an imaging device 1908 of the HMD 1902. Preferably, the imaging device 1908 is an outward facing on-board imaging device of the HMD 1902. Alternatively, the first image data is sensed by multiple imaging devices setup in a space where the user is located. Illustratively, the first image data is a single image. Alternatively, the first image data is a plurality of images or video frames.

In a step 342, in response to the step 222, the information indicating which hand is used to perform the gesture to be estimated from the first image data is received by the at least one self-owned or agent processor 1912 or 1926 of the HMD 1902 and is not detected by the at least one self-owned or agent processor 1912 or 1926 of the HMD 1902 from the first image data by an image-based detection method.

As used here, the term "imaging-based detection method" refers to a method that performs object detection on image data. The image data can be produced by an imaging device 1908 in FIG. 19. The deep learning-based object detection in the existing hand pose estimation 100 is an example of the imaging-based detection method. Other types of object detection are within the contemplated scope of the present disclosure.

In a step 352, side-adapted hand pose estimation on the first image data is performed by the at least one self-owned or agent processor 1912 or 1926 of the HMD 1902 using the information indicating which hand is used to perform the gesture.

The gesture is performed by the second hand and the information indicating which hand is used to perform the gesture is the updated indication with respect to the gesture considering the hand switch state during the first elapsed duration from the sensing time of the first data to the sensing time of the first image data.

Similar to the existing hand pose estimation 100, the method 300 performed by the HMD 1902 illustratively further includes a step of hand detection similar to the step performed by the hand detecting module 104, and a step of cropping the first image data similar to the step performed by the hand image cropping module 106 performed after the step 332 in FIG. 3 and before the step 352 in FIG. 3.

At least one step that the method 200 further includes and/or at least a subset of steps that each of at least one step in the method 200 includes cooperate with at least one step that the method 300 further includes and/or each of at least a subset of steps that at least one step in the method 300 includes to achieve that the information indicating which hand is used to perform the gesture is the updated indication with respect to the gesture considering the hand switch state during the first elapsed duration.

Illustratively, the hand switch state during the first elapsed duration is no occurrences of hand switch is possible during the first elapsed duration when the first elapsed duration is shorter than a longest duration impossible for hand switch and when the first elapsed duration is equal to a longest duration impossible for hand switch. The longest duration impossible for hand switch is a longest duration insufficient for a possibility of, after the mobile device 1904 is switched to be held by an opposite hand of the first hand, the second hand being the first hand to happen. Detailed implementation is to be described with reference to FIGS. 4 and 5.

For the longest duration impossible for hand switch, when the sensing time of the first data sensed by the mobile device 1904 and the sensing time of the first image data of the gesture overlap each other, it is certain that no occurrences of hand switch is possible during the first elapsed duration. When the sensing time of the first data sensed by the mobile device 1904 and the sensing time of the first image data of the gesture does not overlap each other, the longest duration impossible for hand switch (i.e., a threshold) is determined through empirical study. An example of how the threshold is used is to be described in step 420 in FIG. 4.

Figure 4:
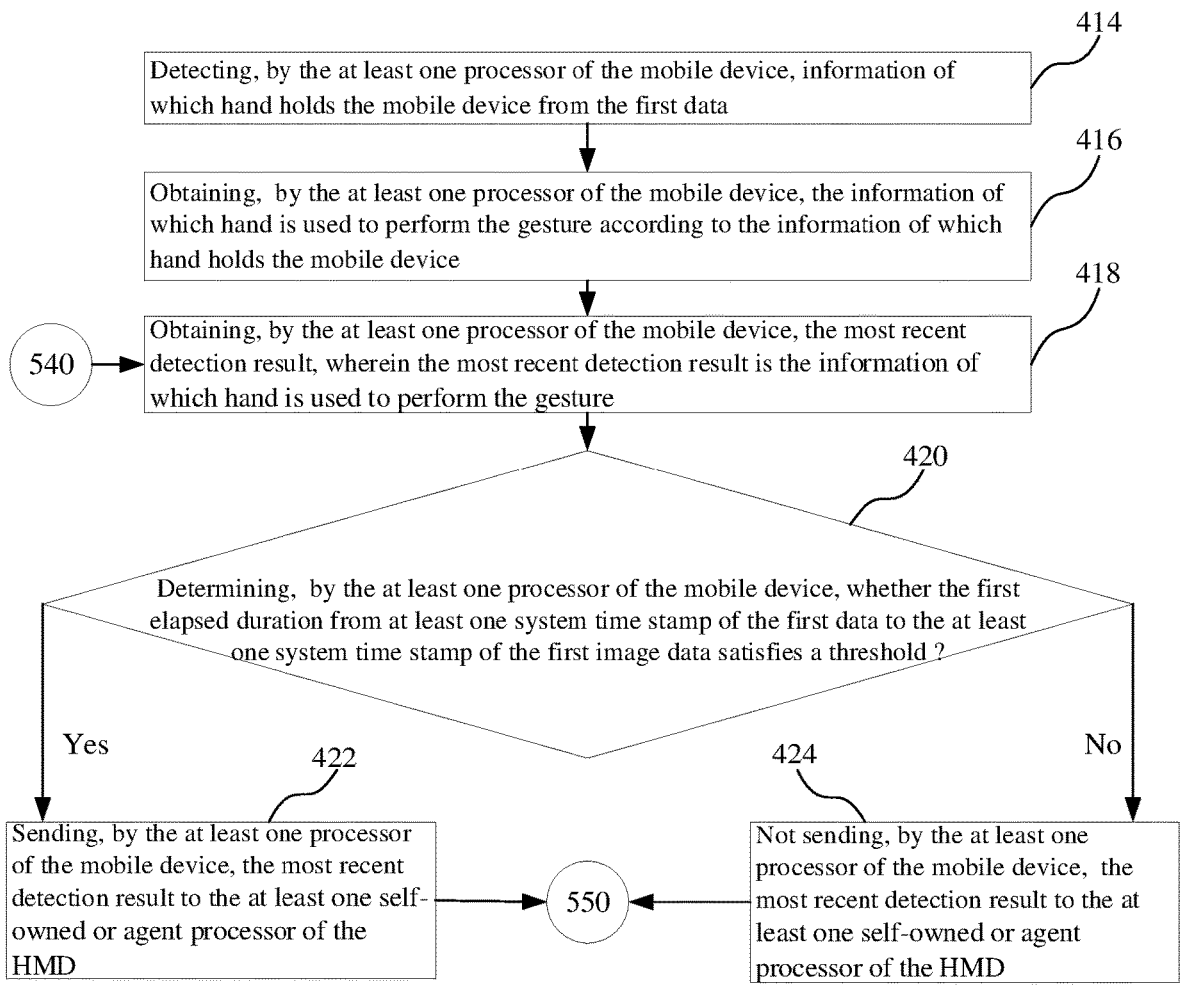
FIGS. 4 and 5 include flowcharts of steps that cooperatively achieve information indicating which hand is used to perform the gesture is an updated indication with respect to the gesture considering no occurrences of hand switch is possible during a first elapsed duration when the first elapsed duration is shorter than the longest duration impossible for hand switch and when the first elapsed duration is equal to the longest duration impossible for hand switch in accordance with some embodiments of the present disclosure.
Figure 5:
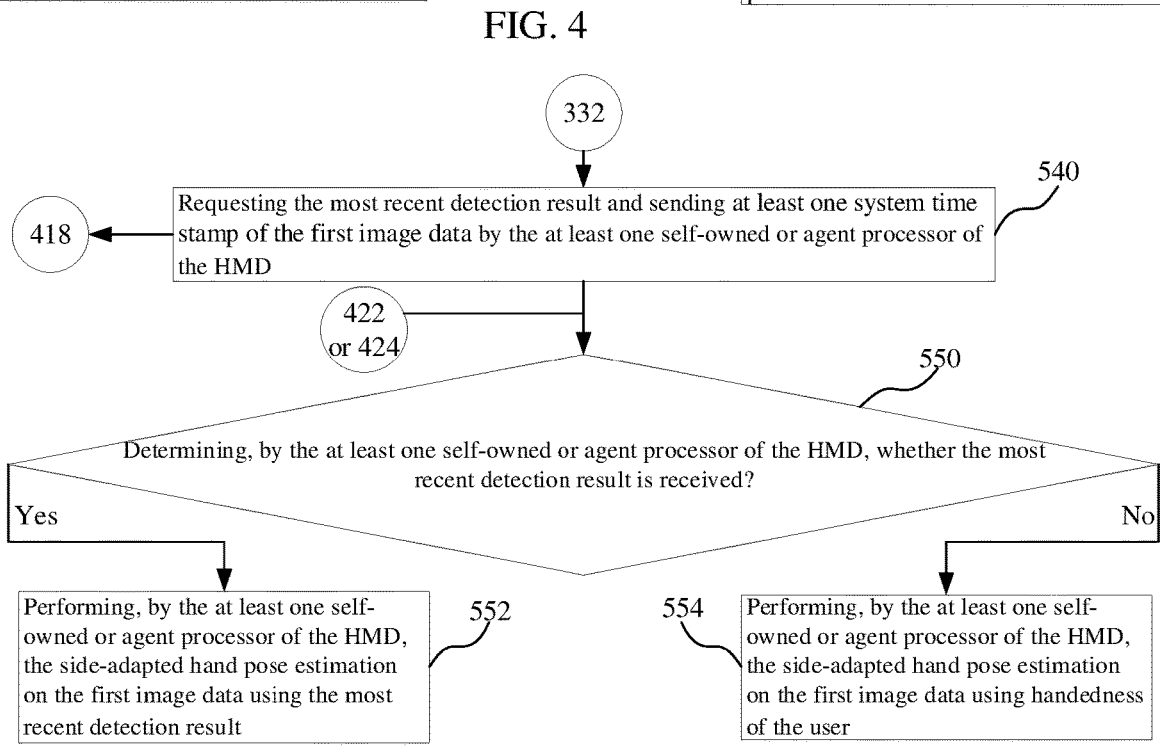

FIGS. 4 and 5 include flowcharts of steps that cooperatively achieve the information indicating which hand is used to perform the gesture is the updated indication with respect to the gesture considering no occurrences of hand switch is possible during the first elapsed duration when the first elapsed duration is shorter than the longest duration impossible for hand switch and when the first elapsed duration is equal to the longest duration impossible for hand switch. The flowchart of FIG. 4 includes at least one step that the method 200 further includes and/or at least a subset of steps that each of at least one step in the method 200 includes. The flowchart of FIG. 5 includes at least one step that the method 300 further includes and/or each of at least a subset of steps that at least one step in the method 300 includes.

Referring to FIG. 4, the step 212 in FIG. 2 includes the steps 414 and 416 that are performed by the at least one processor 1926 of the mobile device 1904. The method 200 further includes steps 418, 420, and 424 that are performed by the at least one processor 1926 of the mobile device 1904. The step 422 is an illustrative implementation of the step 222 in FIG. 2. Referring to FIG. 5, the method 300 further includes steps 540, 550, and 554 that are performed by the at least one self-owned or agent processor 1912 or 1926 of the HMD 1902. A yes branch of the step 550 is an illustrative implementation of the step 342 in FIG. 3. A step 552 is an illustrative implementation of the step 352 in FIG. 3.

In the step 414, information of which hand holds the mobile device is detected from the first data. Illustratively, detection can be performed at a fixed predetermined frequency such as sixty times per second. Alternatively, the method 300 further performs hand tracking that continuously correlates a hand in a current frame with a hand in a previous frame. Detection is skipped when it is determined that the hand in the current frame is same as the hand in the previous frame.

In the step 416, the information of which hand is used to perform the gesture is obtained according to the information of which hand holds the mobile device.

The step 540 is performed after the step 332 in FIG. 3. In the step 540, the most recent detection result is requested and at least one system time stamp of the first image data is sent by the at least one self-owned or agent processor 1912 or 1926 of the HMD 1902.

In the step 418, in response to the step 540, the most recent detection result is obtained by the at least one processor 1926 of the mobile device 1904, wherein the most recent detection result is the information of which hand is used to perform the gesture. From the description for steps 414 and 416, many detection results are obtained over time. Any of these detection results is obtained in a same manner as that of the step 202 and the step 212 in FIG. 2. In order for the condition that the first elapsed duration is shorter than or equal to the longest duration impossible for hand switch to be satisfied, the most recent detection result is used for the step 418. The step 202 and the step 212 results in the most recent detection result.

In the step 420, whether the first elapsed duration from at least one system time stamp of the first data to the at least one system time stamp of the first image data satisfies a threshold is determined by the at least one processor 1926 of the mobile device 1904. The at least one system time stamp of the first data is recorded by the sensing device of the mobile device 1904 that senses the first data. The at least one system time stamp of the first image data is recorded by the imaging device 1908 of the HMD 1902 that senses the first image data. Illustratively, the threshold is an absolute upper bound of the first elapsed duration and thus the threshold is in terms of a real number. Alternatively, the threshold is a relative upper bound of the first elapsed duration and thus the threshold is in terms of a ratio or a percentage.

If the condition in the step 420 is satisfied, in the step 422, the most recent detection result is sent to the at least one self-owned or agent processor 1912 or 1926 of the HMD 1902 by the at least one processor 1926 of the mobile device 1904. The step 422 is the illustrative implementation of the step 222 in FIG. 2.

If the condition in the step 420 is not satisfied, in the step 424, the most recent detection result is not sent to the at least one self-owned or agent processor 1912 or 1926 of the HMD 1902 by the at least one processor 1926 of the mobile device 1904.

In the step 550, in response to the step 422 or 424, whether the most recent detection result is received is determined. The yes branch of the step 550 is the illustrative implementation of the step 342 in FIG. 3.

In the step 552, the side-adapted hand pose estimation is performed on the first image data using the most recent detection result by the at least one self-owned or agent processor 1912 or 1926 of the HMD 1902. The side-adapted hand pose estimation is similar to steps performed by any type of side-adapted hand pose estimation module 110 of the existing hand pose estimation 100. Thus, the most recent detection result is updated with respect to the gesture. The step 552 is the illustrative implementation of the step 352 in FIG. 3.

If the condition in the step 550 is satisfied, in the step 554, the side-adapted hand pose estimation is performed on the first image data using the handedness of the user by the at least one self-owned or agent processor 1912 or 1926 of the HMD 1902. The handedness (i.e., a dominant hand) of the user can be explicitly specified by the user.

Alternatively, the hand switch state during the first elapsed duration is every detected first occurrence of hand switch during the first elapsed duration when the first elapsed duration is shorter than the longest duration impossible for hand switch, when the first elapsed duration is equal to the longest duration impossible for hand switch, and when the first elapsed duration is longer than the longest duration impossible for hand switch. Detailed implementation is to be described with reference FIGS. 6 and 7.

Figure 6:
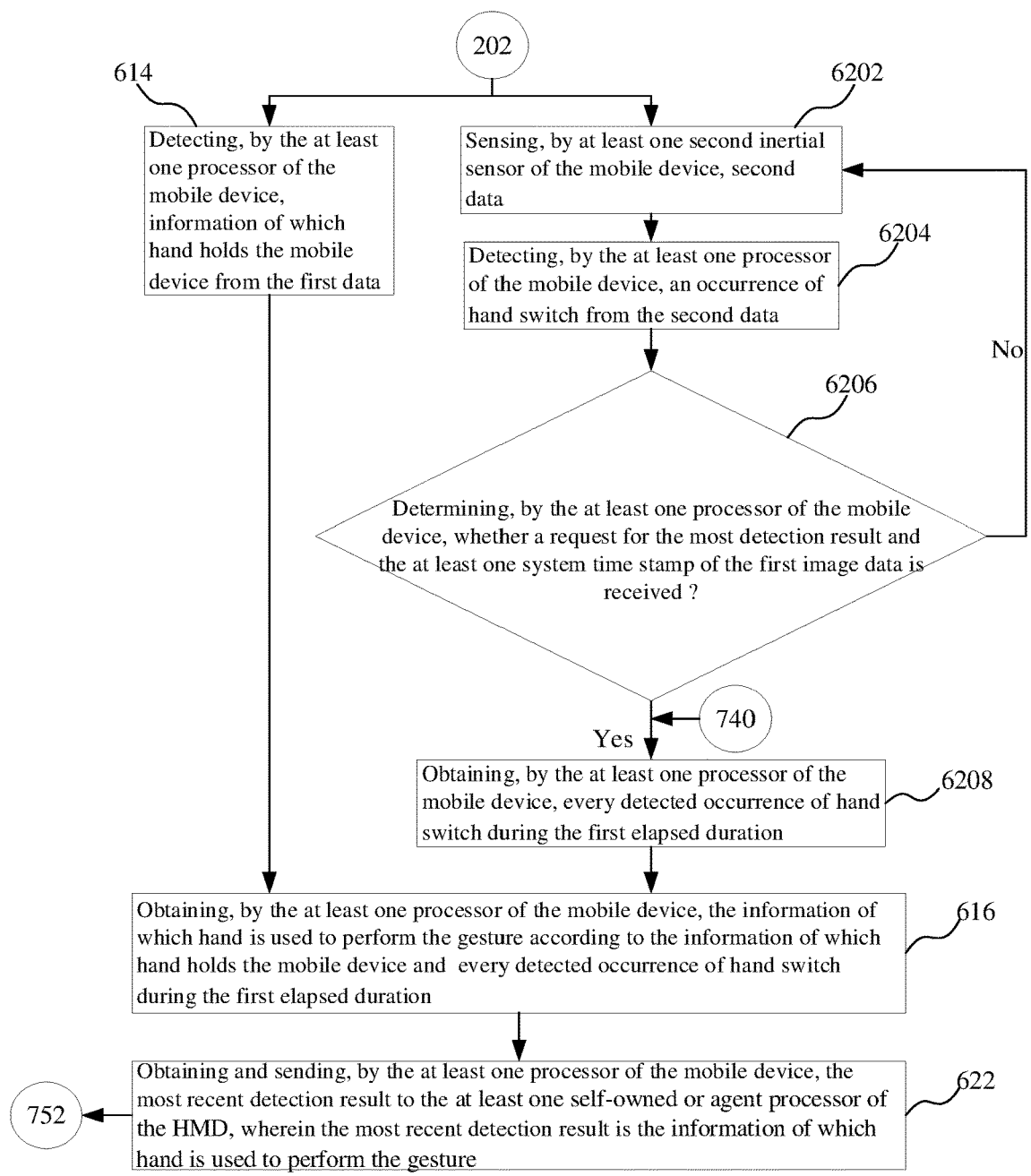
FIGS. 6 and 7 include flowcharts of steps that cooperatively achieve the information indicating which hand is used to perform the gesture is the updated indication with respect to the gesture considering every detected first occurrence of hand switch during the first elapsed duration when the first elapsed duration is shorter than the longest duration impossible for hand switch, when the first elapsed duration is equal to the longest duration impossible for hand switch, and when the first elapsed duration is longer than the longest duration impossible for hand switch in accordance with some embodiments of the present disclosure.
Figure 7:
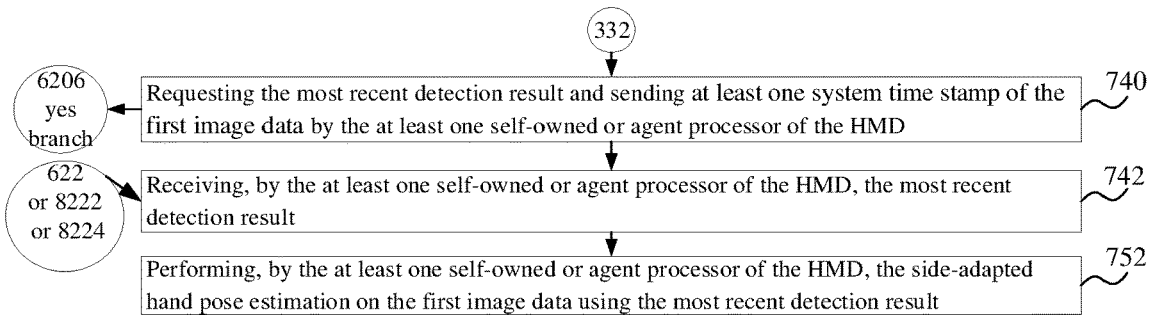

FIGS. 6 and 7 include flowcharts of steps that cooperatively achieve the information indicating which hand is used to perform the gesture is the updated indication with respect to the gesture considering every detected first occurrence of hand switch during the first elapsed duration when the first elapsed duration is shorter than the longest duration impossible for hand switch, when the first elapsed duration is equal to the longest duration impossible for hand switch, and when the first elapsed duration is longer than the longest duration impossible for hand switch. The flowchart of FIG. 6 includes at least one step that the method 200 further includes and/or each of at least a subset of steps that at least one step in the method 200 includes. The flowchart of FIG. 7 includes at least one step that the method 300 further includes and/or each of at least a subset of steps that at least one step in the method 300 includes.

Referring to FIG. 6, the step 212 in FIG. 2 includes the steps 614, 6204, 6206, 6208, and 616 that are performed by the at least one processor 1926 of the mobile device 1904. The method 200 further includes a step 6202 performed by at least one second inertial sensor 1924 of the mobile device 1904. A step 622 includes a part that the method 200 further includes and a part that is an illustrative implementation of the step 222 in FIG. 2. Referring to FIG. 7, the method 300 further includes a step 740 that is performed by the at least one self-owned or agent processor 1912 or 1926 of the HMD 1902. A step 742 is an illustrative implementation of the step 342 in FIG. 3. A step 752 is an illustrative implementation of the step 352 in FIG. 3.

The step 614 is performed after the step 202. In the step 614, information of which hand holds the mobile device is detected from the first data by the at least one processor 1926 of the mobile device 1904. The step 614 is similar to the step 414 in FIG. 4.

A loop formed by the steps 6202, 6204, and 6206 starts from the sensing time of the first data in the step 202. In the step 6202, second data is sensed by the at least one second inertial sensor 1924 of the mobile device 1904.

In the step 6204, an occurrence of hand switch is detected from the second data by the at least one processor 1926 of the mobile device 1904.

In the step 6206, whether a request for the most detection result and the at least one system time stamp of the first image data is received is determined by the at least one processor 1926 of the mobile device 1904. If the condition in the step 6206 is not satisfied, the method 200 loops back to the step 6202.

The step 740 is performed after the step 332 in FIG. 3. In the step 740, the most recent detection result is requested and at least one system time stamp of the first image data is sent by the at least one self-owned or agent processor 1912 or 1926 of the HMD 1902. Then, the condition in the step 6206 is satisfied, and the method 200 proceeds to the step 6208.

In the step 6208, every detected occurrence of hand switch during the first elapsed duration is obtained by the at least one processor 1926 of the mobile device 1904.

In the step 616, the information of which hand is used to perform the gesture is obtained by the at least one processor 1926 of the mobile device 1904 according to the information of which hand holds the mobile device and every detected occurrence of hand switch during the first elapsed duration.

In the step 622, the most recent detection result is obtained and sent to the at least one self-owned or agent processor 1912 or 1926 of the HMD 1902 by the at least one processor 1926 of the mobile device 1904. The most recent detection result is the information of which hand is used to perform the gesture. The obtained part of the step 622 is similar to the step 418. The sending part of the step 622 is an illustrative implementation of the step 222 in FIG. 2. The use of the most recent detection result is less important than the embodiments described with reference to FIGS. 4 and 5 because every occurrence of hand switch during the first elapsed duration is detected.

In the step 742, in response to the step 622, the most recent detection result is received by the at least one self-owned or agent processor 1912 or 1926 of the HMD 1902.

In the step 752, the side-adapted hand pose estimation is performed on the first image data using the most recent detection result by the at least one self-owned or agent processor 1912 or 1926 of the HMD 1902. The step 752 is similar to the step 552.

Still alternatively, the hand switch state during the first elapsed duration is no occurrences of hand switch is possible during the first elapsed duration when the first elapsed duration is shorter than the longest duration impossible for hand switch and when the first elapsed duration is equal to the longest duration impossible for hand switch, and every detected second occurrence of hand switch during the first elapsed duration when the first elapsed duration is longer than the longest duration impossible for hand switch. Detailed implementation is to be described with reference FIGS. 7 and 8.

Figure 8:
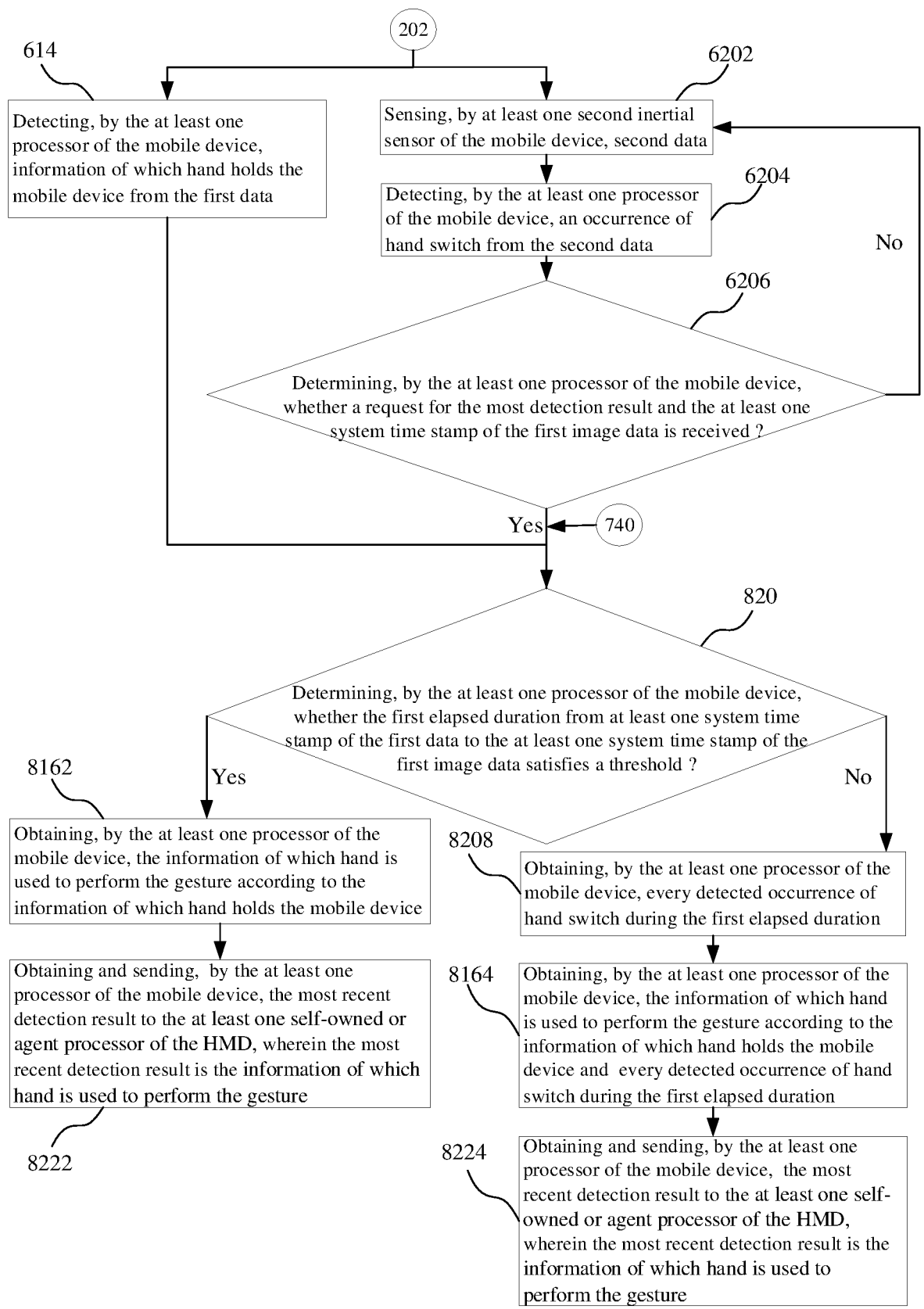

FIGS. 7 and 8 include flowcharts of steps that cooperatively achieve the information indicating which hand is used to perform the gesture is the updated indication with respect to the gesture considering no occurrences of hand switch is possible during the first elapsed duration when the first elapsed duration is shorter than the longest duration impossible for hand switch and when the first elapsed duration is equal to the longest duration impossible for hand switch, and every detected second occurrence of hand switch during the first elapsed duration when the first elapsed duration is longer than the longest duration impossible for hand switch. The flowchart of FIG. 8 includes at least one step that the method 200 further includes and/or each of at least a subset of steps that at least one step in the method 200 includes.

Referring to FIG. 8, the step 212 in FIG. 2 includes the steps 614, 6204, 6206, 820, 8162, 8208, and 8164 that are performed by the at least one processor 1926 of the mobile device 1904. The method 200 further includes steps 6202 performed by at least one second inertial sensor 1924 of the mobile device 1904. Each of a step 8222 and a step 8224 includes a part that the method 200 further includes and a part that is an illustrative implementation of the step 222 in FIG. 2. The steps 614, 6202, 6204, and 6206 have been described above with reference to FIG. 6 and description thereof is omitted here. FIG. 7 has been described above except the step 742 which is to be described below. The description for other steps of FIG. 7 is omitted here.

In the step 820, whether the first elapsed duration from at least one system time stamp of the first data to the at least one system time stamp of the first image data satisfies a threshold is determined by the at least one processor 1926 of the mobile device 1904. The step 820 is similar to the step 420.

If the condition in the step 820 is satisfied, the steps 8162 and 8222 are performed. The step 8162 is similar to the step 416. The step 8222 includes an obtained part that is similar to the step 418 and a part that is similar to the step 422.

If the condition in the step 820 is not satisfied, the steps 8208, 8164, and 8224 are performed. The steps 8208, 8164, and 8224 are similar to the steps 6208, 616, and 622, respectively.

In the step 742, in response to the step 8222 or 8224, the most recent detection result is received by the at least one self-owned or agent processor 1912 or 1926 of the HMD 1902.

The detection method and the alternative detection method described above for the step 414 (similarly the step 614) are illustrative. Still alternatively, detection can be triggered to be performed after the step of hand detection in the method 300 described above. For example, in the flowcharts of FIGS. 4 and 5, the requesting step 540 is replaced by a triggering step that the detecting step 414 in FIG. 4 is in response to. For another example, in the flowcharts of FIGS. 6 and 7 and similarly the flowcharts of FIGS. 7 and 8, the requesting step 740 is replaced by a triggering step that the detecting step 614 and a step of detecting, by the at least one processor of the mobile device, every occurrence of hand switch during the first elapsed duration from the second data are in response to. The step of detecting every occurrence of hand switch during the first elapsed duration replaces the step 6204, 6206 and 6208.

Illustratively, the most recent detection result is selected from detection results retained over time. Alternatively, only the most recent detection result is retained. For example, in the flowcharts of FIGS. 4 and 5, in the step 418, the most recent detection result is obtained in any of the two aforementioned ways. For another example, in the flowcharts of FIGS. 6 and 7, in the step 622, the most recent detection result is obtained in any of the two ways. For still another example, in the flowcharts of FIGS. 7 and 8, in the step 8222 and the step 8224, the most recent detection result is obtained in any of the two ways.

The use of the most recent detection result is illustrative. Alternatively, an earlier detection result that satisfies at least one condition set forth by considering the hand switch state during the first elapsed duration described reference to FIGS. 4 to 5, FIGS. 6 to 7, or FIGS. 7 to 8 can also be used.

Determining, by the mobile device, whether the at least one condition set forth by considering the hand switch state during the first elapsed duration is satisfied is illustrative. Alternatively, determining whether the at least one condition set forth by considering the hand switch state during the first elapsed duration is satisfied can be performed by the HMD 1902. For example, in the flowcharts of FIGS. 4 and 5, the step 422 is performed as long as the most detection result is obtained in the step 418. The step 420 is performed by the at least one self-owned or agent processor 1912 or 1926 of the HMD 1902 and replaces the step 550. For a further example, in the flowcharts of FIGS. 4 and 5, requesting the most detection result by the HMD 1902 in the step 418 can be further replaced by sending a detection result to the HMD 1902 any time new detection result is available by the mobile device 1904. In this way, performing timing of the step 342 in FIG. 3 depends on performing timing of the step 222 and can be before or after the step 332. For still another example, in the flowcharts of FIGS. 6 and 7, any of the steps 6204, 6206, and 6208 can be adapted and performed by the HMD 1902. For still another example, in the flowcharts of FIGS. 7 and 8, any of the steps 6204, 6206, and 8208 can be adapted and performed by the HMD 1902.

The information indicating which hand is used to perform the gesture in the step 222 in FIG. 2 and the step 342 being the information of which hand is used to perform the gesture deduced from the information of which hand holding the mobile device considering the hand switch state during the first elapsed duration is illustrative. Alternatively, the information indicating which hand is used to perform the gesture in the step 222 in FIG. 2 and the step 342 is the information of which hand holding the mobile device. For example, in the flowcharts of FIGS. 4 and 5, the most recent detection result sent in the step 422 is the information of which hand holds the mobile device in the step 414. The step 416 is performed by the at least one self-owned or agent processor 1912 or 1926 of the HMD 1902. For another example, in the flowcharts of FIGS. 6 and 7, the most recent detection result sent in the step 622 is the information of which hand holds the mobile device in the step 614. The step 616 is performed by the at least one self-owned or agent processor 1912 or 1926 of the HMD 1902. For still another example, in the flowcharts of FIGS. 7 and 8, the most recent detection result sent in the step 8222 or 8224 is the information of which hand holds the mobile device in the step 614. The steps 8162 and 8164 are performed by the at least one self-owned or agent processor 1912 or 1926 of the HMD 1902.

For improving the deficiency that the step of detecting the information of which hand is used to perform the gesture is the sequential processing step, any type of data sensed by the mobile device 1904 that alone or in combination with corroborative data reflect which hand holds the mobile device 1904 can be used. For improving the deficiency that the step of detecting the information of which hand is used to perform the gesture is a slower step, any type of data sensed by the mobile device 1904 that alone or in combination with corroborative data reflect which hand holds the mobile device 1904 and results in faster detection of the information of which hand holds the mobile device compared with the imaging-based detection method can be used. A second embodiment, a third embodiment, and a fourth embodiment to be described below provide examples for different types of data sensed by the mobile device 1904 that suits the purpose of reflecting which hand holds the mobile device 1904. Further advantages of some of the different types of data sensed by the mobile device 1904 are described specific to corresponding embodiments.

A first type of data sensed by the mobile device 1904 is pattern data caused by a hand part. The hand part belongs to the hand holding the mobile device 1904 and is not involved in holding the mobile device 1904. The hand part is movable when the hand with the hand part holds the mobile device 1904. However, because the hand part is also movable when an opposite hand of the hand with the hand part holds the mobile device 1904, it is not certain from the pattern data alone that the pattern data is caused by the hand part when the hand with the hand part holds the mobile device 1904. Thus, for this type of data, corroborative data based on image data of the other hand not holding the mobile device 1904 is needed for achieving a higher confidence of the information of which hand holds the mobile device.

Figure 9:
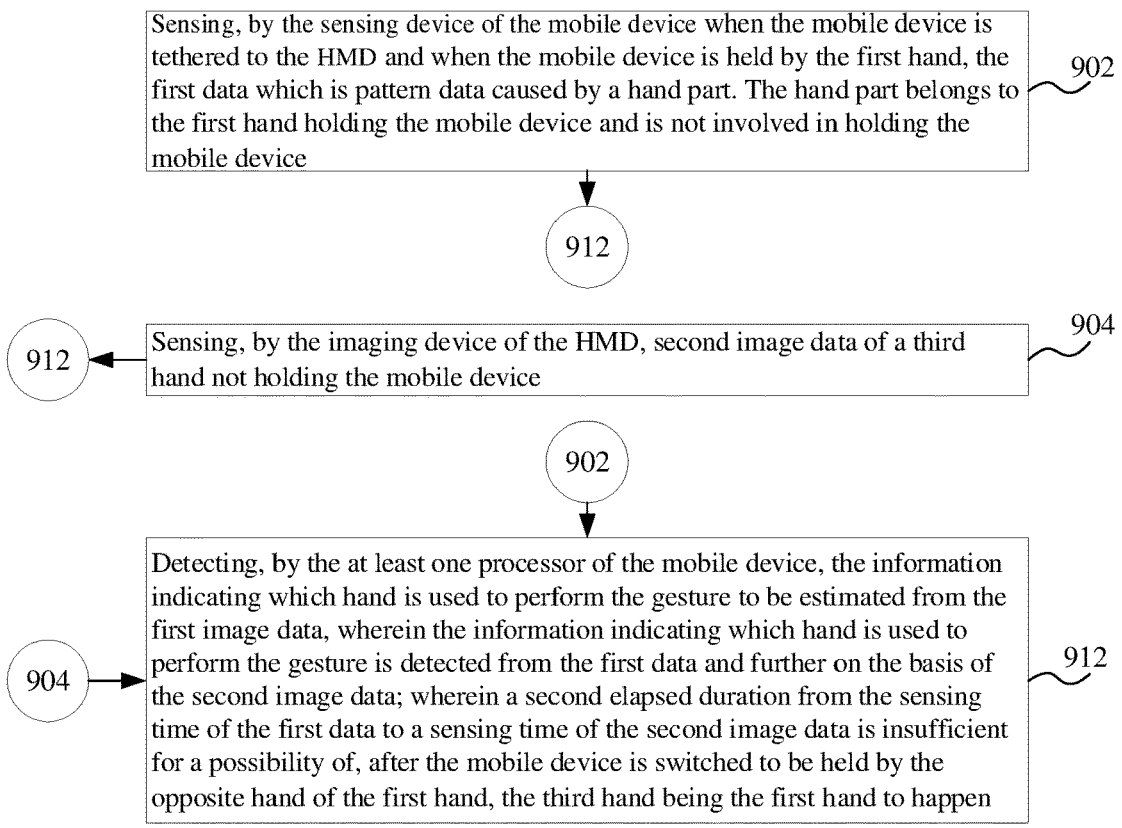
FIG. 9 includes flowcharts of steps related to using pattern data and corroborative data for detecting the information indicating which hand is used to perform the gesture in accordance with some embodiments of the present disclosure.

Referring to FIG. 9, FIG. 9 includes flowcharts of steps related to using the pattern data and the corroborative data for detecting the information indicating which hand is used to perform the gesture in accordance with a second embodiment of the present disclosure. The second embodiment is based on the first embodiment and thus the same content as the first embodiment is omitted here. A step 904 is a step that the method 300 in FIG. 3 further includes. The steps related to using the pattern data and the corroborative data for detecting the information indicating which hand is used to perform the gesture include the following steps.

A step 902 is an embodiment of the step 202 in FIG. 2. In the step 902, when the mobile device 1904 is tethered to the HMD 1902 and when the mobile device 1904 is held by a first hand, the first data is sensed by the sensing device of the mobile device 1904. The first data is caused by a hand part. The hand part belongs to the first hand holding the mobile device 1904 and is not involved in holding the mobile device 1904.

In the step 904, second image data of a third hand not holding the mobile device 1904 is sensed by the imaging device 1908 of the HMD 1902. Illustratively, the step 904 can be performed similarly as the step 332 in FIG. 3.

A step 912 is an embodiment of the step 212 in FIG. 2. The step 912 is performed after the step 902. In a step 912, in response to the step 904, the information indicating which hand is used to perform the gesture to be estimated from the first image data is detected by the at least one processor 1926 of the mobile device 1904. The information indicating which hand is used to perform the gesture is detected from the first data and further on the basis of the second image data. A second elapsed duration from the sensing time of the first data to a sensing time of the second image data is insufficient for a possibility of, after the mobile device 1904 is switched to be held by the opposite hand of the first hand, the third hand being the first hand to happen. The condition that the second elapsed duration from the sensing time of the first data to a sensing time of the second image data is insufficient for a hand switch possibility to happen is checked similarly as the first elapsed duration described with reference to FIGS. 4 and 5.

Figure 10:
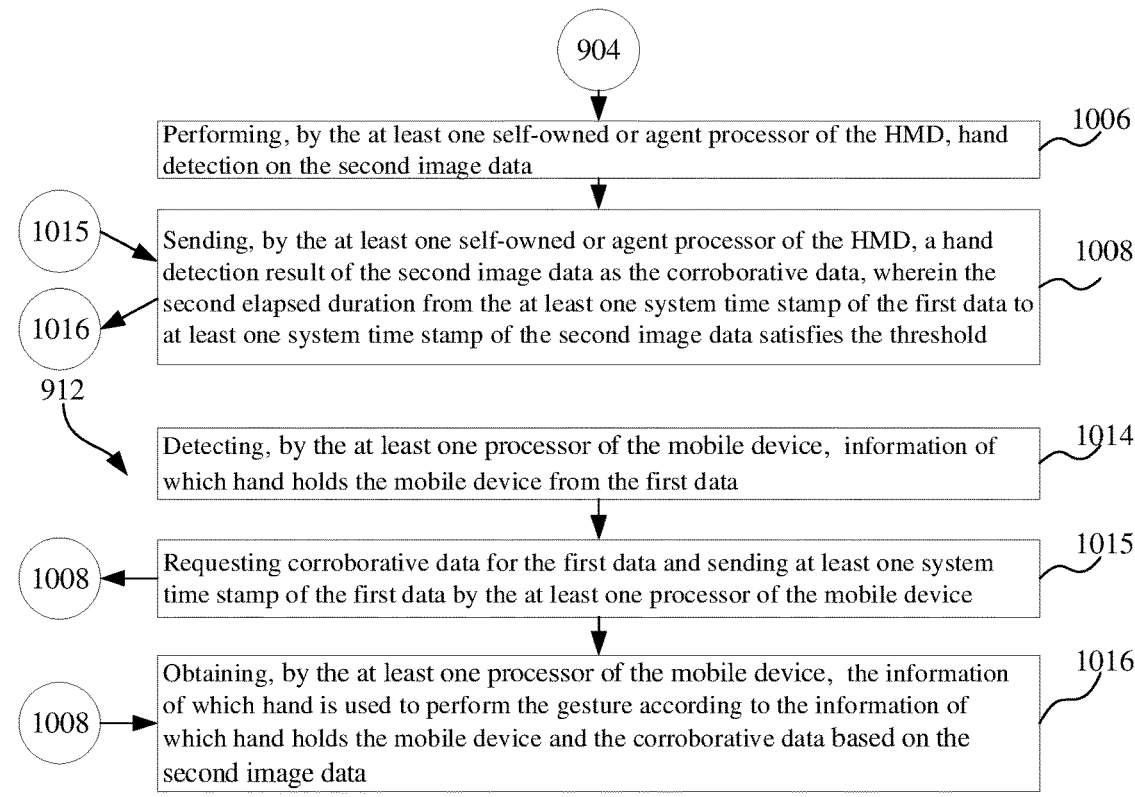
FIG. 10 includes a flowchart of a step in FIG. 9 performed by the mobile device and corresponding steps performed by the HMD in accordance with some embodiments of the present disclosure.

Referring to FIG. 10, FIG. 10 includes a flowchart of the step 912 performed by the mobile device 1904 and corresponding steps performed by the HMD 1902. Steps 1006 and 1008 are steps that the method 300 in FIG. 3 modified by the steps in FIG. 9 further includes. The step 912 performed by the mobile device 1904 and corresponding steps performed by the HMD 1902 includes the following steps.

A step 1006 is performed after the step 904. In the step 1006, hand detection is performed on the second image data by at least one self-owned or agent processor 1912 or 1926 of the HMD 1902. The step 1006 is similar to the step performed by the hand detecting module 104 of the existing hand pose estimation 100.

The step 912 includes the steps 1014, 1015, and 1016.

The step 1014 is similar to the step 414 in FIG. 4.

In the step 1015, corroborative data for the first data is requested and at least one system time stamp of the first data is sent by the at least one processor 1926 of the mobile device 1904.

In the step 1008, in response to the step 1015, a hand detection result of the second image data as the corroborative data is sent by the at least one self-owned or agent processor 1912 or 1926 of the HMD 1902, wherein the second elapsed duration from the at least one system time stamp of the first data to at least one system time stamp of the second image data satisfies the threshold. Details for at least one system time stamp of image data and the threshold have been provided above for the step 420 and are omitted here. Thus, the second elapsed duration from the sensing time of the first data to the sensing time of the second image data is insufficient for a possibility of, after the mobile device 1904 is switched to be held by the opposite hand of the first hand, the third hand being the first hand to happen.

In the step 1016, in response to the step 1008, the information of which hand is used to perform the gesture is obtained by the at least one processor 1926 of the mobile device 1904 according to the information of which hand holds the mobile device 1904 and the corroborative data based on the second image data.

It is preferable that the sensing time of the pattern data and the sensing time of the corroborative data based on the image data of the hand not holding the mobile device 1904 overlap each other (i.e., are simultaneous at least in part) because confidence of the information of which hand holds the mobile device is highest. This is possible because while the hand holding the mobile device 1904 performs an operation using the mobile device 1904 that causes the pattern data to be generated, it is possible that the other hand not holding the mobile device 1904 waits in the air to perform the gesture (i.e., performing an idle hand pose), as to be explained using an illustrative example below.

In addition, it is preferable that the pattern data is touch input pattern data. When the HMD 1902 is tethered to the mobile device 1904, using the mobile device 1904 as an input device can work in tandem with performing the gesture by the other hand not holding the mobile device 1904 to provide user interaction with VR, AR, MR, or XR environment presented in the HMD 1902. Such type of user interaction is referred to herein as a "multi-modal interaction paradigm". Because of the multi-modal interaction paradigm, the touch input pattern data is available for the use of the touch input pattern data to detect the information of which hand holds the mobile device. Further, because of the multi-modal interaction paradigm, the condition that the elapsed duration from the sensing time of the touch input pattern data to the sensing time of the image data of the gesture being shorter than or equal to the longest duration impossible for hand switch will often be satisfied, as to be explained using the illustrative example below. Further, the use of the touch input pattern data to detect the information of which hand holds the mobile device is faster, more accurate and consumes less power compared with the imaging-based detection method.

The preferable feature of the corroborative data based on idle hand pose image data described above can be implemented independently of the preferable feature of the touch input pattern data. However, when they are implemented together, because of the multi-modal interaction paradigm, it is likely that while the hand holding the mobile device 1904 performs an operation using the mobile device 1904 that causes the touch input pattern data to be generated, the other hand not holding the mobile device 1904 waits in the air to perform the gesture, as to be explained using the illustrative example below.

Figure 11:
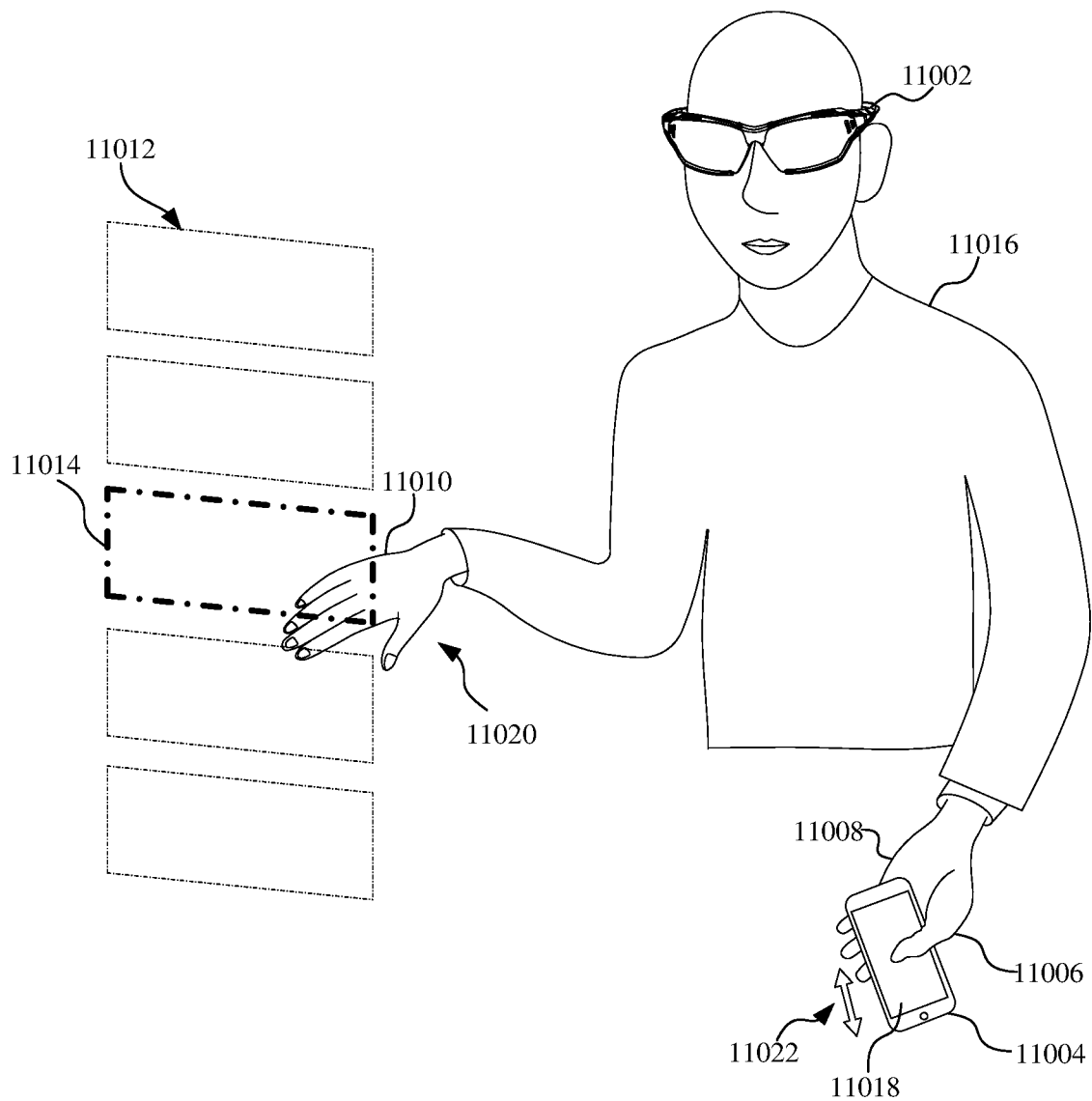
FIGS. 11 and 12 depict an illustrative example for some embodiments in which a preferable feature of corroborative data based on idle hand pose image data and a preferable feature of touch input pattern data is used.
Figure 12:
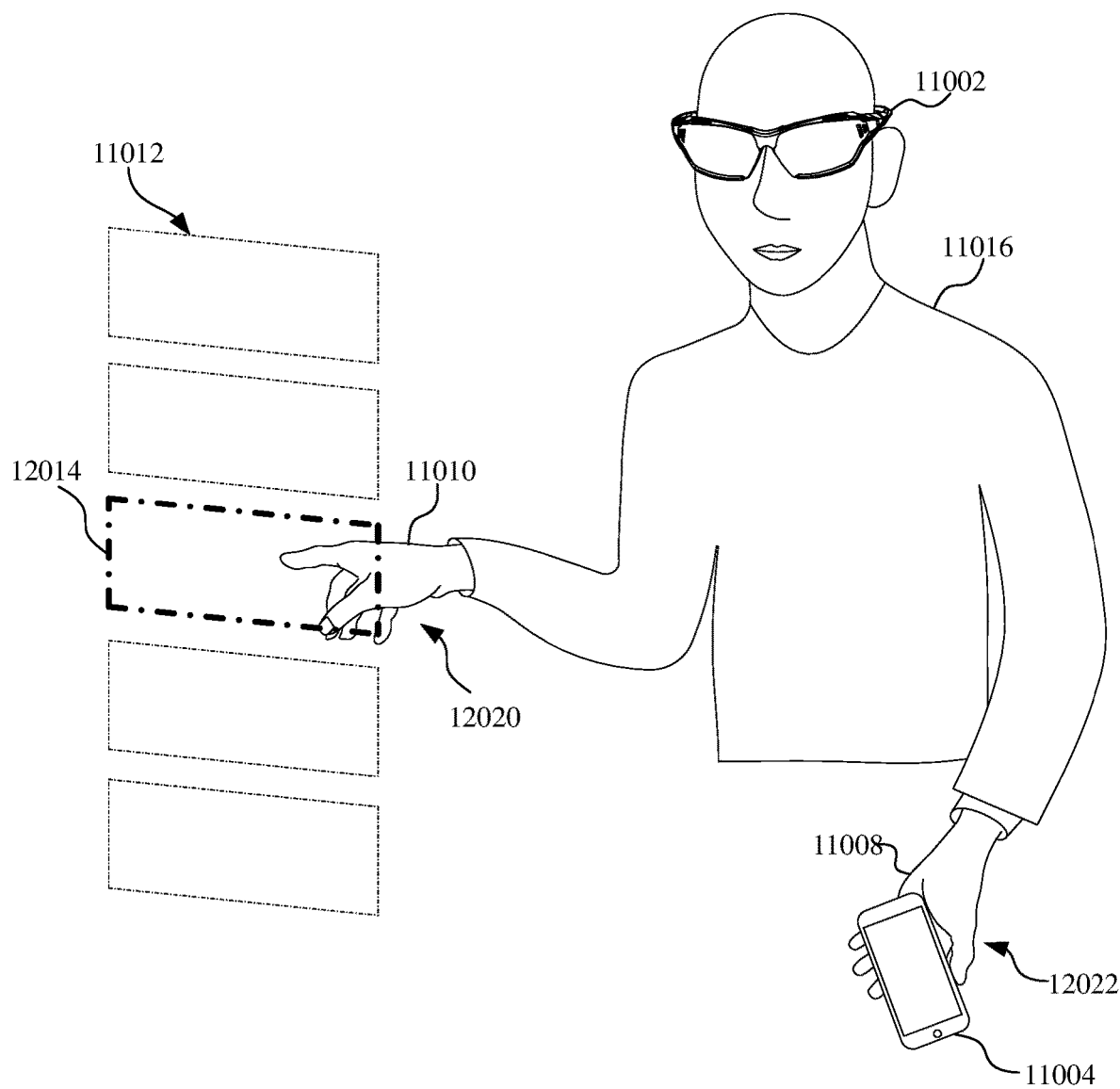

Referring to FIGS. 11 and 12, FIGS. 11 and 12 depict the illustrative example for the second embodiment in which the preferable feature of corroborative data based on the idle hand pose image data and the preferable feature of the touch input pattern data is used. FIG. 11 illustrates that a user 11016 uses a touchscreen 11018 of a mobile device 11004 to perform a swipe input 11022 by a thumb 11006 of a left hand 11008. A virtual list 11012 is displayed by the HMD 11002 and has a plurality of list items (e.g., a list item 11014). The swipe input 11022 is used to swipe up and down to highlight a different one of the list items. The list item 11014 is highlighted as an example. A right hand 11010 of the user 11016 waits in the air (i.e., performing an idle hand pose) to perform a next in-air tab gesture 12020 illustrated in FIG. 12. The HMD 11002, the mobile device 11004, and the touchscreen 11018 correspond to the HMD 1902, the mobile device 1904, and the touchscreen 1918 in FIG. 19, respectively.

Referring to FIGS. 9, 10, and 11, in the step 902, the touchscreen 11018 of the mobile device 11004 senses, when the mobile device 11004 is tethered to the HMD 11002 and when the mobile device 11004 is held by the first hand (e.g., the left hand 11008), the first data which is pattern data caused by the hand part (e.g., the thumb 11006). The hand part belongs to the left hand 11008 holding the mobile device 11004 and is not involved in holding the mobile device 11004. Because the user 11016 uses the touchscreen 11018 of the mobile device 11004 to perform the swipe input 11022, the sensing device is the touchscreen 11018 and the pattern data is touch input pattern data. Further, in the example in FIG. 11, the hand part is the thumb 11006 of the left hand 11008 and the mobile device 11004 is held by the left hand 11008 from below. Using the thumb 11006 of the left hand 11008 to perform the swipe input 11022 while the mobile device 11004 is held by the left hand 11008 from below is more ergonomic.

In the step 904, the imaging device 1908 of the HMD 11002 senses the second image data of the third hand (e.g., right hand 11010) not holding the mobile device 11004. The right hand 11010 performs the idle hand pose 11020.

In the step 912, the at least one processor 1926 of the mobile device 11004 detects the information indicating which hand is used to perform the gesture to be estimated from the first image data, wherein the information indicating which hand is used to perform the gesture is detected from the touch input pattern data and further on the basis of the second image data. Details for the step 912 are provided below.

In the step 1014, the at least one processor 1926 of the mobile device 11004 detects the information of which hand holds the mobile device from the touch input pattern data. For example, the touch input pattern data is a trajectory of the swipe input 11022 using the touchscreen 11018. For details of using the trajectory of the swipe input 11022 to detect the information of which hand holds the mobile device, please refer to "Detecting Handedness from Device Use", Collarbone, stack overflow, 2015, https://stackoverflow.com/questions/27720226/detecting-handedness-from-device-use. For another example, the touch input pattern data is raw capacitive data of the swipe input 11022 using the touchscreen 11018. For details of using the raw capacitive data of the swipe input 11022 to detect the information of which hand holds the mobile device, please refer to "Investigating the feasibility of finger identification on capacitive touchscreens using deep learning", Huy Viet Le, Sven Mayer, and Niels Henze, IUI '19: Proceedings of the 24th International Conference on Intelligent User Interfaces.

In the step 1015, the at least one processor 1926 of the mobile device 11004 requests corroborative data for the touch input pattern data and sends at least one system time stamp of the touch input pattern data.

In the step 1006 followed by the step 904, the at least one self-owned or agent processor 1912 or 1926 of the HMD 11002 performs hand detection on the second image data. Because the second image data is image data of the idle hand pose 11020 of the right hand 11010, a hand detection result indicates that a hand is present.

In the step 1008, the at least one self-owned or agent processor 1912 or 1926 of the HMD 11002 sends the hand detection result of the second image data as the corroborative data, wherein the second elapsed duration from the at least one system time stamp of the touch input pattern data to at least one system time stamp of the second image data satisfies the threshold. Because while the left hand 11008 holding the mobile device 11004 performs the swipe input 11022 using the mobile device 11004, the right hand 11010 not holding the mobile device 11004 performs the idle pose 11020 in the air, the sensing time of the touch input pattern data and the sensing time of the second image data overlap each other. In other words, in the illustrative implementation of the step 1008, the second elapsed duration from the at least one system time stamp of the touch input pattern data to at least one system time stamp of the second image data satisfies the threshold.

In the step 1016, the at least one processor 1926 of the mobile device 11004 obtains the information of which hand is used to perform the gesture according to the information of which hand holds the mobile device and the corroborative data based on the second image data. The gesture is the next in-air tab gesture 12020 to be described with reference to FIG. 12.

FIG. 12 illustrates the user 11016 performs the in-air tab gesture 12020 with the right hand 11010 to confirm that the highlighted list item 11014 in FIG. 11 is the selected list item 12014. The left hand 11008 is in a state 12022 of not performing any touch input at this time.

Referring to FIGS. 2, 3, 4, 5, and 12, in the step 332, the imaging device 1908 of the HMD 11002 senses the first image data from which the in-air tab gesture 12020 is to be estimated.

In the step 540, the at least one self-owned or agent processor 1912 or 1926 of the HMD 11002 requests the most recent detection result and sends at least one system time stamp of the first image data.

In the step 418, the at least one processor 1926 of the mobile device 11004 obtains the most recent detection result. Because the left hand 11008 is in the state 12022 of not performing any touch input while the right hand 11010 is used to perform the in-air tab gesture 12020, the most recent detection result is the information of which hand is used to perform the in-air tab gesture 12020 obtained in the step 1016 described with reference to FIG. 11.

In the step 420, the at least one processor 1926 of the mobile device 11004 determines whether the first elapsed duration from at least one system time stamp of the touch input pattern data to the at least one system time stamp of the first image data satisfies the threshold. Because the swipe input 11022 described with reference to FIG. 11 and the in-air tab gesture 12020 are used to interact with the virtual list 11012, the scenario in FIGS. 11 and 12 is one example of the multi-modal interaction paradigm mentioned above. The condition in the step 420 is satisfied.

In the step 422, the at least one processor 1926 of the mobile device 11004 sends the information of which hand is used to perform the in-air tab gesture 12020 to the HMD 11002.

In the step 342 (i.e., the yes branch of the step 550), the at least one self-owned or agent processor 1912 or 1926 of the HMD 11002 receives the information of which hand is used to perform the in-air tab gesture 12020 and does not detect the information indicating which hand is used to perform the gesture by the image-based detection method.

In the step 552, the at least one self-owned or agent processor 1912 or 1926 of the HMD 11002 performs the side-adapted hand pose estimation on the first image data using the information of which hand is used to perform the in-air tab gesture 12020.

The second embodiment in which the preferable feature of the corroborative data based on the idle hand pose image data is used is illustratively described with reference to FIG. 11. Alternatively, the corroborative data can be on the basis of the image data of the in-air tab gesture 12020 in FIG. 12.

In the illustrative example in FIG. 11, the thumb 11006 of the left hand 11008 is used to perform the swipe input 11022 while the mobile is held by the left hand 11008. Alternatively, an index finger of the left hand 11008 is used to perform a swipe input while the mobile device 11004 is held by the left hand 11008 from above.

Illustratively, in the second embodiment, it is preferable that the sensing device is the touchscreen 11018 and the pattern data is the touch input pattern data. Alternatively, the sensing device is a fingerprint sensing device and the pattern data is fingerprint pattern data.

A second type of data sensed by the mobile device 1904 is data reflecting an orientation of the mobile device 1904 caused by the hand holding the mobile device 1904. For this type of data, corroborative data similar to that of the second embodiment is not needed. In addition to the touch input pattern data that is available because of the multi-modal interaction paradigm, the data reflecting an orientation of the mobile device 1904 is also available because of the multi-modal interaction paradigm. The mobile device 1904 part of the multi-modal interaction paradigm can be provided by using the mobile device 1904 as a pointing device that can point to an element in the VR, AR, MR, or XR environment presented in the HMD 1902. Because a pointing direction of a virtual pointer beam generated by the pointing device is controlled by the data reflecting the orientation of the mobile device 1904, the data reflecting the orientation of the mobile device 1904 is available for the use of the data reflecting the orientation of the mobile device 1904 to detect the information of which hand holds the mobile device. Further, because of the multi-modal interaction paradigm, the condition that the elapsed duration from the sensing time of the data reflecting the orientation of the mobile device 1904 to the sensing time of the image data of the gesture being shorter than or equal to the longest duration impossible for hand switch will often be satisfied, as to be explained using the illustrative example below. Still further, the use of the data reflecting an orientation of the mobile device 1904 to detect the information of which hand holds the mobile device is faster and consumes less power compared with the imaging-based detection method. Preferably, using the second type of data to detect the information of which hand holds the mobile device is implemented together with using the first type of data to detect the information of which hand holds the mobile device. In this way, because times when the mobile device 1904 is used as a touch input device supplement times when the mobile device 1904 is used as a pointing device, it will be more often for the condition that the elapsed duration from the sensing time of the data sensed by the mobile device 1904 to the sensing time of the image data of the gesture being shorter than or equal to the longest duration impossible for hand switch to be satisfied.

Referring to FIG. 13, FIG. 13 is a flowchart of a step related to using the data reflecting an orientation of the mobile device 1904 for detecting the information indicating which hand is used to perform the gesture in accordance with a third embodiment of the present disclosure. The third embodiment is based on the first embodiment and thus the same content as the first embodiment is omitted here.

A step 1302 is an embodiment of the step 202 in FIG. 2. In the step 1302, when the mobile device 1904 is tethered to the HMD 1902 and when the mobile device 1904 is held by the first hand, the first data is sensed by at least one first inertial sensor 1920 (illustrated in FIG. 19) of the mobile device 1904. The first data is data reflecting an orientation of the mobile device 1904 caused by the first hand holding the mobile device 1904, wherein the data reflecting the orientation of the mobile device 1904 is used, when the mobile device 1904 is used as a pointing device, to control a pointing direction of a virtual pointer beam.

In an embodiment of the orientation of the mobile device 1904, the orientation of the mobile device 1904 can be represented by three degrees of freedom (3DOF) including three rotational components such as pitch (i.e., rotation about the Y-axis), yaw (i.e., rotation about the Z-axis), and roll (i.e., rotation about the X-axis). Other degrees of freedom that are known in the art to be suitable for orientation detection for the mobile device 1904 are within the contemplated scope of the present disclosure.

Referring to FIG. 14, FIG. 14 depicts the illustrative example for the third embodiment in which the feature of data reflecting an orientation of the mobile device 1904 is used. In the example in FIG. 14, the user 14016 holds the mobile device 14004 with a left hand 14008 uses the mobile device 14004 as a pointing device that generates a virtual pointer beam 14022 that points to one of the list items (e.g., the list item 14014) of a virtual list 14012 displayed by the HMD 14002. The virtual pointer beam 14022 has been used to point up and down to highlight a different one of the list items. In FIG. 14, while the virtual pointer beam 14022 points to the highlighted list item 14014, the user 14016 performs an in-air tab gesture 14020 with a right hand 14010 to confirm that the highlighted list item 14014 is selected. The HMD 14002 and the mobile device 14004 correspond to the HMD 1902 and the mobile device 1904, respectively.

Referring to FIGS. 2, 3, 4, 5, 13, and 14, in the step 1302, the at least one first inertial sensor 1920 of the mobile device 14004 senses, when the mobile device 14004 is tethered to the HMD 14002 and when the mobile device 14004 is held by the first hand (e.g., the left hand 14008), the first data which is data reflecting an orientation of the mobile device 14004 caused by the left hand 14008 holding the mobile device 14004, wherein the data reflecting the orientation of the mobile device 14004 is used, when the mobile device 14004 is used as the pointing device, to control a pointing direction of the virtual pointer beam 14022. The sensing device is the at least one first inertial sensor 1920. In an embodiment of the pointing direction of the virtual pointer beam 14022, the pointing direction is parallel to a screen 14018 of the mobile device 14004. Other relationships between the pointing direction and a body of the mobile device 14004 are within the contemplated scope of the present disclosure. The virtual pointer beam 14022 is, for example, a virtual laser beam.

In the step 212, the at least one processor 1926 of the mobile device 14004 detects the information indicating which hand is used to perform a gesture to be estimated from first image data, wherein the information indicating which hand is used to perform the gesture is detected from the data reflecting the orientation of the mobile device 14004. Details for the step 212 are provided below.

In the step 414, the at least one processor 1926 of the mobile device 14004 detects information of which hand holds the mobile device 14004 from the data reflecting the orientation of the mobile device 14004. Detecting the information of which hand holds the mobile device 14004 from the data reflecting the orientation of the mobile device 14004 can be done by methods known in the art.

In the step 416, the at least one processor 1926 of the mobile device 14004 obtains the information of which hand is used to perform the gesture according to the information of which hand holds the mobile device 14004. The gesture is the in-air tab gesture 14020.

In the step 332, the imaging device 1908 of the HMD 14002 senses the first image data from which the in-air tab gesture 14020 is to be estimated.

In the step 540, the at least one self-owned or agent processor 1912 or 1926 of the HMD 14002 requests the most recent detection result and sends at least one system time stamp of the first image data.

In the step 418, the at least one processor 1926 of the mobile device 14004 obtains the most recent detection result. Because the left hand 14008 uses the mobile device 14004 as the pointing device that generates the virtual pointer beam 14022 that points to the list item 14014 while the right hand 14010 is used to perform the in-air tab gesture 14020, the most recent detection result is the information of which hand is used to perform the in-air tab gesture 14020 obtained in the step 416 mentioned above.

In the step 420, the at least one processor 1926 of the mobile device 14004 determines whether the first elapsed duration from at least one system time stamp of the data reflecting the orientation of the mobile device 14004 to the at least one system time stamp of the first image data satisfies the threshold. Because using the mobile device 14004 as the pointing device and performing the in-air tab gesture 14020 work in tandem to interact with the virtual list 14012, the scenario in FIG. 14 is one example of the multi-modal interaction paradigm mentioned above. In the example in FIG. 14, the sensing time of data reflecting the orientation of the mobile device 14004 and the sensing time of the first image data overlap each other. The condition in the step 420 is satisfied.

In the step 422, the at least one processor 1926 of the mobile device 14004 sends the information of which hand is used to perform the in-air tab gesture 14020 to the HMD 14002.

In the step 342 (i.e., the yes branch of the step 550), the at least one self-owned or agent processor 1912 or 1926 of the HMD 14002 receives the information of which hand is used to perform the in-air tab gesture 14020 and does not detect the information indicating which hand is used to perform the gesture by the image-based detection method.

In the step 552, the at least one self-owned or agent processor 1912 or 1926 of the HMD 14002 performs the side-adapted hand pose estimation on the first image data using the information of which hand is used to perform the in-air tab gesture 14020.

A third type of data sensed by the mobile device 1904 is image data sensed by imaging device 1922 of the mobile device 1904 such as a at least one front imaging device. For this type of data, corroborative data similar to that of the second embodiment is not needed. When the hand holding the mobile device 1904 is biased to a first side (e.g., a left side) from a torso of a user, the imaging device 1922 senses a head of the user from the first side and thus the sensed head of the user in the image data sensed by the imaging device 1922 is biased to a second side (e.g., a right side) of the image data sensed by the imaging device 1922. The first side is the same said of the user by which an arm connected to a hand same as the hand holding the mobile device 1904 is hanging. Thus, the imaging data of the sensed head of the user being biased to the second side can be used to detect the information of which hand holds the mobile device, as to be explained using an illustrative example below.

The third type of data sensed by the mobile device 1904 is not specific to any kind of use of the mobile device 1904 as an input device. The third type of data sensed by the mobile device 1904 can be used when the mobile device 1904 is used as a touch input device or a pointing device, or when the mobile device 1904 is not used as an input device. Further, the sensing time of the image data sensed by the imaging device 1922 of the mobile device 1904 does not have to correspond to a time when the mobile device 1904 is used as the input device and can correspond to time when the image data of the gesture is sensed. Due to at least one of advantages of higher confidence, faster speed, higher accuracy, and lower power consumption of using at least one of the first type of data or the second type of data for detecting the information of which hand holds the mobile device, preferably, using the third type of data to detect the information of which hand holds the mobile device is implemented together with using at least one of the first type of data or the second type of data to detect the information of which hand holds the mobile device. More preferably, using the third type of data to detect the information of which hand holds the mobile device is implemented together with using both the first type of data and the second type of data to detect the information of which hand holds the mobile device. In this way, because times when the mobile device 1904 is not used as an input device supplement times when the mobile device 1904 is used as the touch input device and when the mobile device 1904 is used as the pointing device, it will be even more often for the condition that the elapsed duration from the sensing time of the data sensed by the mobile device 1904 to the sensing time of the image data of the gesture being shorter than or equal to the longest duration impossible for hand switch to be satisfied.

Referring to FIG. 15, FIG. 15 is a flowchart of a step related to using the image data sensed by an imaging device 1922 of the mobile device 1904 for detecting the information indicating which hand is used to perform the gesture in accordance with a fourth embodiment of the present disclosure. The fourth embodiment is based on the first embodiment and thus the same content as the first embodiment is omitted here.

A step 1502 is an embodiment of the step 202 in FIG. 2. In the step 1502, when the mobile device 1904 is tethered to the HMD 1902 and when the mobile device 1904 is held by the first hand, the first data is sensed. The first data is third image data sensed by an imaging device 1922 (illustrated in FIG. 19) of the mobile device 1904, wherein information of a head of a user in the third image data being biased to a side of the third image data is used to detect the information indicating which hand is used to perform the gesture.

Illustratively, the imaging device 1922 is a front imaging device.

Referring to FIG. 16, FIG. 16 depicts the illustrative example for the fourth embodiment in which the feature of the image data sensed by the imaging device 1922 of the mobile device 1904 is used. In the example in FIG. 16, the user 16016 holds the mobile device 16004 with a left hand 16008 and does not use the mobile device 16004 as an input device. A virtual list 16012 is displayed by the HMD 16002 and has a plurality of list items (e.g., a list item 16014). The user 16016 has used an in-air swipe gesture with a right hand 16010 to swipe up and down to highlight a different one of the list items. The list item 16014 is highlighted as an example. In FIG. 16, while the user 16016 does not use the mobile device 16004 as the input device, the user 16016 performs an in-air tab gesture 16020 with the right hand 16010 to confirm that the highlighted list item 16014 is selected. The HMD 16002 and the mobile device 16004 correspond to the HMD 1902 and the mobile device 1904 in FIG. 19, respectively.

Referring to FIGS. 2, 3, 4, 15, and 16, in the step 1502, a front imaging device 16024 (corresponding to the imaging device 1922 in FIG. 19) of the mobile device 16004 senses when the mobile device 16004 is tethered to the HMD 16002 and when the mobile device 16004 is held by the first hand (e.g., the left hand 16008), the first data which is third image data 16026, wherein information of a head 16028 of a user (corresponding to the user 16016) in the third image data 16026 being biased to a side of the third image data 16026 is used to detect the information indicating which hand is used to perform the gesture. The sensing device is the front imaging device 16024.

In the step 212, the at least one processor 1926 of the mobile device 16004 detects the information indicating which hand is used to perform a gesture to be estimated from first image data, wherein the information indicating which hand is used to perform the gesture is detected from the third image data 16026 sensed by the front imaging device 16024 of the mobile device 16004. Details for the step 212 are provided below.

In the step 414, the at least one processor 1926 of the mobile device 16004 detects information of which hand holds the mobile device 16004 from the third image data 16026 sensed by the front imaging device 16024 of the mobile device 16004.

In the step 416, the at least one processor 1926 of the mobile device 16004 obtains the information of which hand is used to perform the gesture according to the information of which hand holds the mobile device 16004. The gesture is the in-air tab gesture 16020.

In the step 332, the imaging device 1908 of the HMD 16002 senses the first image data from which the in-air tab gesture 16020 is to be estimated.

In the step 540, the at least one self-owned or agent processor 1912 or 1926 of the HMD 16002 requests the most recent detection result and sends at least one system time stamp of the first image data.

In the step 418, the at least one processor 1926 of the mobile device 16004 obtains the most recent detection result. Because the left hand 16008 uses the mobile device 16004 as the pointing device that generates the virtual pointer beam 16022 that points to the list item 16014 while the right hand 16010 is used to perform the in-air tab gesture 16020, the most recent detection result is the information of which hand is used to perform the in-air tab gesture 16020 obtained in the step 416 mentioned above.

In the step 420, the at least one processor 1926 of the mobile device 16004 determines whether the first elapsed duration from at least one system time stamp of the third image data 16026 sensed by the front imaging device 16024 of the mobile device 16004 to the at least one system time stamp of the first image data satisfies the threshold. Because as mentioned above, the sensing time of the image data sensed by the imaging device 1922 of the mobile device 1904 does not have to correspond to a time when the mobile device 1904 is used as the input device and can correspond to time when the image data of the gesture is sensed. Thus, the sensing time of the third image data 16026 sensed by the front imaging device 16024 of the mobile device 16004 and the sensing time of the first image data overlap each other. The condition in the step 420 is satisfied.

In the step 422, the at least one processor 1926 of the mobile device 16004 sends the information of which hand is used to perform the in-air tab gesture 16020 to the HMD 16002.

In the step 342 (i.e., the yes branch of the step 550), the at least one self-owned or agent processor 1912 or 1926 of the HMD 16002 receives the information of which hand is used to perform the in-air tab gesture 16020 and does not detect the information indicating which hand is used to perform the gesture by the image-based detection method.

In the step 552, the at least one self-owned or agent processor 1912 or 1926 of the HMD 16002 performs the side-adapted hand pose estimation on the first image data using the information of which hand is used to perform the in-air tab gesture 16020.

The illustrative examples described with reference to FIGS. 11, 12, 14, and 16 are described on the basis of the embodiments described with reference to FIGS. 4 and 5, and apply mutatis mutandis to the embodiments described with reference to FIGS. 6, 7, and 8.

For improving the deficiency that the step of detecting the information of which hand is used to perform the gesture is the sequential processing step, a part of the method performed by the at least one self-owned or agent processor 1912 or 1926 of the HMD 1902 (i.e., the method 300) is performed by at least one first process, and a part of the method performed by the at least one processor 1926 of the mobile device 1904 (i.e., the method 200) is performed by at least one second process, wherein the at least one first process and the at least one second process are parallel processes.

Figures 17, 18:
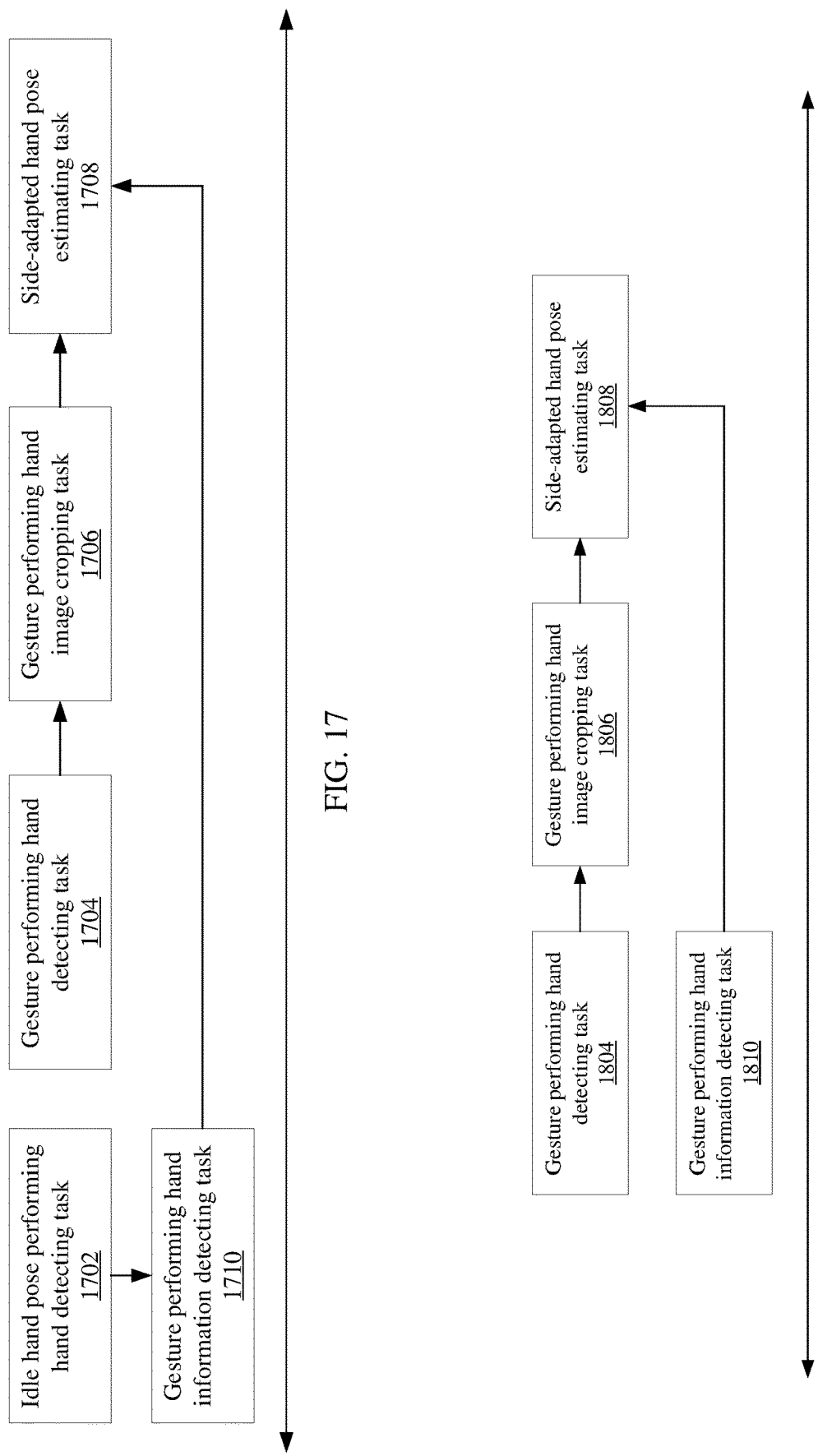
FIG. 17 is a timeline diagram that illustrates parallel processing of a part of the method performed by the at least one self-owned or agent processor of the HMD and a part of the method performed by the at least one processor of the mobile device based on some embodiments of the present disclosure.
FIG. 18 is a timeline diagram that illustrates parallel processing of a part of the method performed by the at least one self-owned or agent processor of the HMD and a part of the method performed by the at least one processor of the mobile device based on some embodiments of the present disclosure.

Referring to FIG. 17, FIG. 17 is a timeline diagram that illustrates parallel processing of a part of the method performed by the at least one self-owned or agent processor 1912 or 1926 of the HMD 1902 and a part of the method performed by the at least one processor 1926 of the mobile device 1904 based on the second embodiment of the present disclosure. In order to illustrate how the deficiency that the step of detecting the information of which hand is used to perform the gesture is the sequential processing step is improved by parallel processing the method 300 performed by the at least one processor 1926 of the mobile device 1904 and the method 200 performed by the at least one processor 1926 of the mobile device 1904, the steps performed by the method 300 and the method 200 are grouped into tasks similar to how steps performed by the existing hand pose estimation 100 are grouped into modules in FIG. 1.

Illustratively, the steps performed by the method 300 are grouped into an idle hand pose performing hand detecting task 1702, a gesture performing hand detecting task 1704, a gesture performing hand image cropping task 1706, and a side-adapted hand pose estimating task 1708 performed by a first process of the at least one self-owned or agent processor 1912 or 1926 of the HMD 1902. The steps performed by the method 200 are grouped into a gesture performing hand information detecting task 1710 performed by a second process of the at least one processor 1926 of the mobile device 1904.

The following steps are performed in the method 200. The steps 912 and 222 are implemented by (1) the steps in FIG. 4, (2) the steps in FIG. 6 that are performed by the at least one processor 1926 of the mobile device 1904, or (3) the steps in FIG. 8 that are performed by the at least one processor 1926 of the mobile device 1904 with a part corresponding to the step 212 replaced by the steps included by the step 912 in FIG. 10. The steps in each of the three implementations are grouped into the gesture performing hand information detecting task 1710.

The following steps are performed in the method 300. The steps 1006 and 1008 are grouped into the idle hand pose performing hand detecting task 1702. The step of hand detection and the step of cropping the first image data described with reference to but not illustrated in FIG. 2 correspond to the gesture performing hand detecting task 1704 and the gesture performing hand image cropping task 1706, respectively. The step 342 is implemented by (1) the steps 540 and 550 in FIG. 5, or (2) the step 742 in FIG. 7. The step(s) in each of the two implementations are omitted to be grouped into a task for the purpose of parallel processing because of its trivialness in time in comparison to other tasks in FIG. 17. The step 352 is implemented by (1) the step 552 in FIG. 5 or (2) the step 752 in FIG. 7. The step in each of the two implementation is grouped into the side-adapted hand pose estimating task 1708.

Illustratively, a part of the gesture performing hand information detecting task 1710 depends on the idle hand pose performing hand detecting task 1702. Thus, a part of the gesture performing hand information detecting task 1710 that does not depend on the idle hand pose performing hand detecting task 1702 can be performed in parallel with the idle hand pose performing hand detecting task 1702. Although the gesture performing hand detecting task 1704 does not depends on the idle hand pose performing hand detecting task 1702, because the idle hand pose and the gesture happen sequentially, the idle hand pose performing hand detecting task 1702 and the gesture performing hand detecting task 1704 are performed sequentially. The gesture performing hand image cropping task 1706 depends on the gesture performing hand detecting task 1704. Thus, the gesture performing hand detecting task 1704 and the gesture performing hand image cropping task 1706 are performed sequentially. The gesture performing hand detecting task 1704 and the gesture performing hand image cropping task 1706 do not depend on the gesture performing hand information detecting task 1710 and vice versa. Thus, the gesture performing hand detecting task 1704 and the gesture performing hand image cropping task 1706 can be performed in parallel with the gesture performing hand information detecting task 1710. The side-adapted hand pose estimating task 1708 depends on the gesture performing hand image cropping task 1706 and the gesture performing hand information detecting task 1710. Thus, the gesture performing hand image cropping task 1706 and the side-adapted hand pose estimating task 1708 are performed sequentially, and the gesture performing hand information detecting task 1710 and the side-adapted hand pose estimating task 1708 are performed sequentially.

Referring to FIG. 18, FIG. 18 is a timeline diagram that illustrates parallel processing of a part of the method performed by the at least one self-owned or agent processor 1912 or 1926 of the HMD 1902 and a part of the method performed by the at least one processor 1926 of the mobile device 1904 based on the third embodiment and fourth embodiment of the present disclosure. In order to illustrate how the deficiency that the step of detecting the information of which hand is used to perform the gesture is the sequential processing step is improved by parallel processing the method 300 performed by the at least one processor 1926 of the mobile device 1904 and the method 200 performed by the at least one processor 1926 of the mobile device 1904, the steps performed by the method 300 and the method 200 are grouped into tasks similar to how steps performed by the existing hand pose estimation 100 are grouped into modules in FIG. 1.

Illustratively, the steps performed by the method 300 are grouped into a gesture performing hand detecting task 1804, a gesture performing hand image cropping task 1806, and a side-adapted hand pose estimating task 1808 performed by a first process of the at least one self-owned or agent processor 1912 or 1926 of the HMD 1902. The steps performed by the method 200 are grouped into a gesture performing hand information detecting task 1810 performed by a second process of the at least one processor 1926 of the mobile device 1904.

The following steps are performed in the method 200. The steps 212 and 222 are implemented by (1) the steps in FIG. 4, (2) the steps in FIG. 6 that are performed by the at least one processor 1926 of the mobile device 1904, or (3) the steps in FIG. 8 that are performed by the at least one processor 1926 of the mobile device 1904. The steps in each of the three implementations are grouped into the gesture performing hand information detecting task 1810.

The following steps are performed in the method 300. The step of hand detection and the step of cropping the first image data described with reference to but not illustrated in FIG. 2 correspond to the gesture performing hand detecting task 1804 and the gesture performing hand image cropping task 1806, respectively. The step 342 is implemented by (1) the steps 540 and 550 in FIG. 5 or (2) the step 742 in FIG. 7. The step(s) in each of the two implementations are omitted to be grouped into a task for the purpose of parallel processing because of its trivialness in time in comparison to other tasks in FIG. 18. The step 352 is implemented by (1) the step 552 in FIG. 5 or (2) the step 752 in FIG. 7. The step in each of the two implementation is grouped into the side-adapted hand pose estimating task 1808.

Illustratively, the gesture performing hand image cropping task 1806 depends on the gesture performing hand detecting task 1804. Thus, the gesture performing hand detecting task 1804 and the gesture performing hand image cropping task 1806 are performed sequentially. The gesture performing hand detecting task 1804 and the gesture performing hand image cropping task 1806 do not depend on the gesture performing hand information detecting task 1810 and vice versa. Thus, the gesture performing hand detecting task 1804 and the gesture performing hand image cropping task 1806 can be performed in parallel with the gesture performing hand information detecting task 1810. The side-adapted hand pose estimating task 1808 depends on the gesture performing hand image cropping task 1806 and the gesture performing hand information detecting task 1810. Thus, the gesture performing hand image cropping task 1806 and the side-adapted hand pose estimating task 1808 are performed sequentially, and the gesture performing hand information detecting task 1810 and the side-adapted hand pose estimating task 1808 are performed sequentially.

Figure 19:
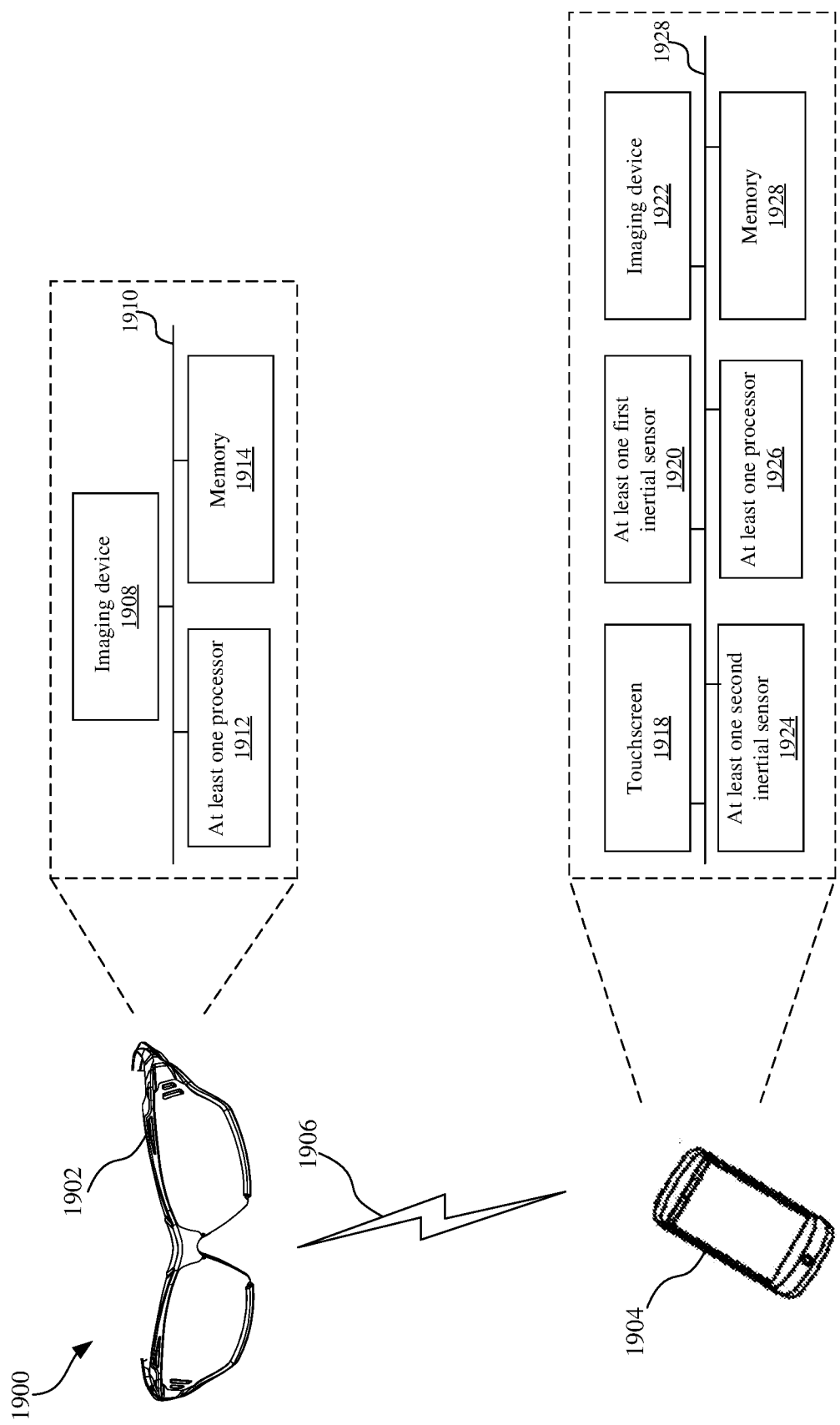
FIG. 19 is a diagram that illustrates a system in which the methods described herein may be implemented in accordance with some embodiments of the present disclosure.

Referring to FIG. 19, FIG. 19 is a diagram that illustrates a system 1900 in which the methods described herein may be implemented. The system 1900 includes the HMD 1902 and the mobile device 1904. The HMD 1902 can be AR glasses, VR headset, or smart glasses without a full 3D display (e.g., Google Glass). The mobile device 1904 can be a smartphone, or a computing box, etc. The HMD 1902 is tethered to the mobile device 1904 wirelessly via Wi-Fi 1906, or Bluetooth, etc., or via a USB cable.

The HMD 1902 includes the imaging device 1908, the at least one processor 1912 (i.e., the at least one self-owned processor), a memory 1914, and buses 1910.

The imaging device 1908 includes at least one vision sensor (e.g., at least one RGB camera). Alternatively, imaging device 1908 includes at least one ultrasonic sensor. Still alternatively, imaging device 1908 includes at least one millimeter wave sensor.

The at least one processor 1912 may be implemented as a "processing system." Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. At least one processor in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The at least one agent processor of the HMD 1902 can be at least one processor 1926 of the mobile device.

The functions implemented in software may be stored on or encoded as one or more instructions or code on a computer-readable medium. Computer-readable media includes computer storage media, which may also be referred to as a non-transitory computer-readable medium. The term non-transitory computer-readable medium excludes transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. The memory 1914 may be referred to as a computer-readable medium.

The buses 1910 couples the imaging device 1908 and the memory 1914 to the at least one processor 1912.

The mobile device 1904 includes the touchscreen 1918, the at least one first inertial sensor 1920, the imaging device 1922, the at least one second inertial sensor 1924, the at least one processor 1926, a memory 1928, and buses 1928.

The sensing device in the step 202 in FIG. 2 includes the touchscreen 1918. Alternatively, the sensing device includes the at least one first inertial sensor 1920. Still alternatively, the sensing device includes the imaging device 1922.

The touchscreen 1918 can be a capacitive touchscreen, a resistive touchscreen, an infrared touchscreen, or a touchscreen based on ultrasonic sound waves, etc.

The at least one first inertial sensor 1920 and the at least one second inertial sensor 1924 are included in an inertial measurement unit (IMU) of the mobile device 1904. Examples of an inertial sensor include an accelerometer, a gyroscope, and a magnetometer. The at least one first inertial sensor 1920 and the at least one second inertial sensor 1924 may be same at least in part.

The imaging device 1922 includes at least one vision sensor (e.g., at least one RGB camera). Alternatively, the imaging device 1922 includes at least one ultrasonic sensor. Still alternatively, the imaging device 1922 includes at least one millimeter wave sensor.

The at least one processor 1926 may be implemented as a "processing system." Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. At least one processor in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more embodiments, the functions implemented in software may be stored on or encoded as one or more instructions or code on a computer-readable medium. Computer-readable media includes computer storage media, which may also be referred to as a non-transitory computer-readable medium. The term non-transitory computer-readable medium excludes transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. The memory 1928 may be referred to as a computer-readable medium.

The buses 1928 couples the touchscreen 1918, the at least one first inertial sensor 1920, the imaging device 1922, the at least one second inertial sensor 1924, and the memory 1928 to the at least one processor 1926.

What is claimed is:

1. A method performed by a mobile device, comprising:
    sensing, by a sensing device of the mobile device when the mobile device is tethered to a head mounted display (HMD) and when the mobile device is held by a first hand, first data;
    detecting, by at least one processor of the mobile device, information indicating which hand is used to perform a gesture to be estimated from first image data by at least one self-owned or agent processor of the HMD,
        wherein the information indicating which hand is used to perform the gesture is not detected, by the HMD, from the first image data by an imaging-based detection method and is detected from the first data;

sending, by the at least one processor of the mobile device, the information indicating which hand is used to perform the gesture to the at least one self-owned or agent processor of the HMD so that, performing timing of the sending step being such that the at least one self-owned or agent processor of an HMD performs side-adapted hand pose estimation on the first image data using the information indicating which hand is used to perform the gesture;

wherein the gesture is performed by a second hand and the information indicating which hand is used to perform the gesture is an updated indication with respect to the gesture considering a hand switch state during a first elapsed duration from a sensing time of the first data to a sensing time of the first image data.

2. The method of claim 1,
wherein a longest duration impossible for hand switch is a longest duration insufficient for a possibility of, after the mobile device is switched to be held by an opposite hand of the first hand, the second hand being the first hand to happen;

wherein the information indicating which hand is used to perform the gesture is the updated indication with respect to the gesture considering when the first elapsed duration is shorter than the longest duration impossible for hand switch and when the first elapsed duration is equal to the longest duration impossible for hand switch, no occurrences of hand switch is possible during the first elapsed duration;

when the first elapsed duration is shorter than the longest duration impossible for hand switch, when the first elapsed duration is equal to the longest duration impossible for hand switch, and when the first elapsed duration is longer than the longest duration impossible for hand switch, every detected first occurrence of hand switch during the first elapsed duration; or when the first elapsed duration is shorter than the longest duration impossible for hand switch and when the first elapsed duration is equal to the longest duration impossible for hand switch, no occurrences of hand switch is possible during the first elapsed duration, and when the first elapsed duration is longer than the longest duration impossible for hand switch, every detected second occurrence of hand switch during the first elapsed duration.

3. The method of claim 1,
wherein the method further comprises:
sensing, by at least one inertial sensor of the mobile device, second data; and
detecting, by at least one processor of the mobile device, every occurrence of hand switch during the first elapsed duration from the second data;

wherein the information indicating which hand is used to perform the gesture is the updated indication with respect to the gesture considering at least every occurrence of hand switch during the first elapsed duration.

4. The method of claim 1,
wherein the first data is pattern data caused by a hand part, the hand part belonging to the first hand holding the mobile device and being not involved in holding the mobile device;

wherein the information indicating which hand is used to perform the gesture is further detected on the basis of second image data of a third hand not holding the mobile device, wherein the second image data is sensed by an imaging device of the HMD;

wherein a second elapsed duration from the sensing time of the first data to a sensing time of the second image data is insufficient for a possibility of, after the mobile device is switched to be held by the opposite hand of the first hand, the third hand being the first hand to happen.

5. The method of claim 4,
wherein the pattern data is touch input pattern data; and
wherein a longest duration impossible for hand switch is a longest duration insufficient for a possibility of, after the mobile device is switched to be held by an opposite hand of the first hand, the second hand being the first hand to happen;

wherein the information indicating which hand is used to perform the gesture is the updated indication with respect to the gesture considering when the first elapsed duration is shorter than the longest duration impossible for hand switch and when the first elapsed duration is equal to the longest duration impossible for hand switch, no occurrences of hand switch is possible during the first elapsed duration; or when the first elapsed duration is shorter than the longest duration impossible for hand switch and when the first elapsed duration is equal to the longest duration impossible for hand switch, no occurrences of hand switch is possible during the first elapsed duration, and when the first elapsed duration is longer than the longest duration impossible for hand switch, every detected second occurrence of hand switch during the first elapsed duration.

6. The method of claim 1,
wherein the first data is data reflecting an orientation of the mobile device caused by the first hand holding the mobile device,
wherein the data reflecting the orientation of the mobile device is used, when the mobile device is used as a pointing device, to control a pointing direction of a virtual pointer beam.

7. The method of claim 1,
wherein the first data is third image data sensed by an imaging device of the mobile device,
wherein information of a head of a user in the third image data being biased to a side of the third image data is used to detect the information indicating which hand is used to perform the gesture.

8. A method performed by a head-mounted display (HMD), comprising:
receiving, by at least one self-owned or agent processor of the HMD, information indicating which hand is used to perform a gesture to be estimated from first image data, and not detecting, by the at least one self-owned or agent processor of the HMD, the information indicating which hand is used to perform the gesture by an image-based detection method;

wherein the information indicating which hand is used to perform the gesture is detected by a mobile device from first data sensed by a sensing device of the mobile device when the HMD is tethered to the mobile device and when the mobile device is held by a first hand; and wherein the gesture is performed by a second hand and the information indicating which hand is used to perform the gesture is an updated indication with respect to the gesture considering a hand switch state during a first elapsed duration from a sensing time of the first data to a sensing time of the first image data; and performing, by the at least one self-owned or agent processor of the HMD, side-adapted hand pose estimation on the first image data using the information indicating which hand is used to perform the gesture.

9. The method of claim 8,
wherein a longest duration impossible for hand switch is a longest duration insufficient for a possibility of, after the mobile device is switched to be held by an opposite hand of the first hand, the second hand being the first hand to happen;
wherein the information indicating which hand is used to perform the gesture is the updated indication with respect to the gesture considering
 when the first elapsed duration is shorter than the longest duration impossible for hand switch and when the first elapsed duration is equal to the longest duration impossible for hand switch, no occurrences of hand switch is possible during the first elapsed duration;
 when the first elapsed duration is shorter than the longest duration impossible for hand switch, when the first elapsed duration is equal to the longest duration impossible for hand switch, and when the first elapsed duration is longer than the longest duration impossible for hand switch, every detected first occurrence of hand switch during the first elapsed duration; or
 when the first elapsed duration is shorter than the longest duration impossible for hand switch and when the first elapsed duration is equal to the longest duration impossible for hand switch, no occurrences of hand switch is possible during the first elapsed duration, and when the first elapsed duration is longer than the longest duration impossible for hand switch, every detected second occurrence of hand switch during the first elapsed duration.

10. The method of claim 8,
wherein the first data is pattern data caused by a hand part, the hand part belonging to the first hand holding the mobile device and being not involved in holding the mobile device;
wherein the method further comprises sensing, by an imaging device of the HMD, second image data of a third hand not holding the mobile device,
wherein the information indicating which hand is used to perform the gesture is further detected on the basis of the second image data; and
wherein a second elapsed duration from the sensing time of the first data to a sensing time of the second image data is insufficient for a possibility of, after the mobile device is switched to be held by the opposite hand of the first hand, the third hand being the first hand to happen.

11. The method of claim 10,
wherein in the second image data of the third hand, the third hand performs an idle hand pose; and
wherein the sensing time of the first data and the sensing time of the second image data overlap each other.

12. A method performed by a mobile device and a head-mounted display (HMD), comprising:
sensing, by a sensing device of the mobile device when the mobile device is tethered to the HMD and when the mobile device is held by a first hand, first data;

detecting, by at least one processor of the mobile device, information indicating which hand is used to perform a gesture to be estimated from first image data by at least one self-owned or agent processor of the HMD, wherein the information indicating which hand is used to perform the gesture is detected from the first data;
sending, by the at least one processor of the mobile device, the information indicating which hand is used to perform the gesture to the at least one self-owned or agent processor of the HMD;
receiving, by the at least one self-owned or agent processor of the HMD, the information indicating which hand is used to perform the gesture, and not detecting, by the at least one self-owned or agent processor of the HMD, the information indicating which hand is used to perform the gesture by an image-based detection method;
wherein the gesture is performed by a second hand and the information indicating which hand is used to perform the gesture is an updated indication with respect to the gesture considering a hand switch state during a first elapsed duration from a sensing time of the first data to a sensing time of the first image data; and
performing, by the at least one self-owned or agent processor of the HMD, side-adapted hand pose estimation on the first image data using the information indicating which hand is used to perform the gesture.

13. The method of claim 12,
wherein a longest duration impossible for hand switch is a longest duration insufficient for a possibility of, after the mobile device is switched to be held by an opposite hand of the first hand, the second hand being the first hand to happen;
wherein the information indicating which hand is used to perform the gesture is the updated indication with respect to the gesture considering
 when the first elapsed duration is shorter than the longest duration impossible for hand switch and when the first elapsed duration is equal to the longest duration impossible for hand switch, no occurrences of hand switch is possible during the first elapsed duration;
 when the first elapsed duration is shorter than the longest duration impossible for hand switch, when the first elapsed duration is equal to the longest duration impossible for hand switch, and when the first elapsed duration is longer than the longest duration impossible for hand switch, every detected first occurrence of hand switch during the first elapsed duration; or
 when the first elapsed duration is shorter than the longest duration impossible for hand switch and when the first elapsed duration is equal to the longest duration impossible for hand switch, no occurrences of hand switch is possible during the first elapsed duration, and when the first elapsed duration is longer than the longest duration impossible for hand switch, every detected second occurrence of hand switch during the first elapsed duration.

14. The method of claim 12,
wherein the method further comprises:
sensing, by at least one inertial sensor of the mobile device, second data; and
detecting, by at least one processor of the mobile device, every occurrence of hand switch during the first elapsed duration from the second data;
wherein the information indicating which hand is used to perform the gesture is the updated indication with respect to the gesture considering at least every occurrence of hand switch during the first elapsed duration.

15. The method of claim 12,
wherein the first data is pattern data caused by a hand part, the hand part belonging to the first hand holding the mobile device and being not involved in holding the mobile device;
wherein the method further comprises sensing, by an imaging device of the HMD, second image data of a third hand not holding the mobile device;
wherein the information indicating which hand is used to perform the gesture is further detected on the basis of second image data of a third hand not holding the mobile device; and
wherein a second elapsed duration from the sensing time of the first data to a sensing time of the second image data is insufficient for a possibility of, after the mobile device is switched to be held by the opposite hand of the first hand, the third hand being the first hand to happen.

16. The method of claim 15,
wherein the pattern data is touch input pattern data; and
wherein a longest duration impossible for hand switch is a longest duration insufficient for a possibility of, after the mobile device is switched to be held by an opposite hand of the first hand, the second hand being the first hand to happen;
wherein the information indicating which hand is used to perform the gesture is the updated indication with respect to the gesture considering
when the first elapsed duration is shorter than the longest duration impossible for hand switch and when the first elapsed duration is equal to the longest duration impossible for hand switch, no occurrences of hand switch is possible during the first elapsed duration; or
when the first elapsed duration is shorter than the longest duration impossible for hand switch and when the first elapsed duration is equal to the longest duration impossible for hand switch, no occurrences of hand switch is possible during the first elapsed duration, and when the first elapsed duration is longer than the longest duration impossible for hand switch, every detected second occurrence of hand switch during the first elapsed duration.

17. The method of claim 12,
wherein the first data is third image data sensed by an imaging device of the mobile device,
wherein information of a head of a user in the third image data being biased to a side of the third image data is used to detect the information indicating which hand is used to perform the gesture.

18. A mobile device, comprising:
a sensing device configured to perform a step that is performed by the sensing device in the method according to claim 1;
a memory; and
at least one processor coupled to the memory and configured to perform steps that are performed by the at least one processor in the method.

19. A head-mounted display (HMD), comprising:
a memory; and
at least one self-owned processor coupled to the memory and configured to perform steps in the method according to claim 8.

20. A system, comprising:
a mobile device, comprising:
a sensing device configured to perform a step that is performed by the sensing device in the method according to claim 12;
a first memory; and
at least one processor coupled to the first memory and configured to perform steps that are performed by the at least one processor in the method;
the HMD, comprising:
a second memory; and
at least one self-owned or agent processor coupled to the second memory and configured to perform steps that are performed by the at least one self-owned or agent processor in the method.

* * * * *